US011036697B2

(12) United States Patent
Griffith et al.

(10) Patent No.: US 11,036,697 B2
(45) Date of Patent: Jun. 15, 2021

(54) TRANSMUTING DATA ASSOCIATIONS AMONG DATA ARRANGEMENTS TO FACILITATE DATA OPERATIONS IN A SYSTEM OF NETWORKED COLLABORATIVE DATASETS

(71) Applicants: David Lee Griffith, Austin, TX (US); Bryon Kristen Jacob, Austin, TX (US); Shad William Reynolds, Austin, TX (US)

(72) Inventors: David Lee Griffith, Austin, TX (US); Bryon Kristen Jacob, Austin, TX (US); Shad William Reynolds, Austin, TX (US)

(73) Assignee: data.world, Inc., Austin, TX (US)

( * ) Notice: Subject to any disclaimer, the term of this patent is extended or adjusted under 35 U.S.C. 154(b) by 416 days.

(21) Appl. No.: 15/943,629

(22) Filed: Apr. 2, 2018

(65) Prior Publication Data
US 2019/0042606 A1   Feb. 7, 2019

Related U.S. Application Data

(63) Continuation-in-part of application No. 15/186,514, filed on Jun. 19, 2016, now Pat. No. 10,102,258, and
(Continued)

(51) Int. Cl.
*G06F 16/21* (2019.01)
*G06F 16/22* (2019.01)
*G06F 16/23* (2019.01)

(52) U.S. Cl.
CPC ........ *G06F 16/213* (2019.01); *G06F 16/2272* (2019.01); *G06F 16/2365* (2019.01)

(58) Field of Classification Search
None
See application file for complete search history.

(56) References Cited

U.S. PATENT DOCUMENTS 6,144,962 A  11/2000 Weinberg et al.
6,317,752 B1 11/2001 Lee et al.
(Continued)

FOREIGN PATENT DOCUMENTS

CA   2820994 A1   1/2014
CN   103425734 B   6/2017
(Continued)

OTHER PUBLICATIONS

Boutros et al., "Computerized Tools to Develop and Manage Data-Driven Projects Collaboratively via a Networked Computing Platform and Collaborative Datasets," U.S. Appl. No. 15/985,702, filed May 22, 2018.
(Continued)

*Primary Examiner* — Kim T Nguyen
(74) *Attorney, Agent, or Firm* — Kokka & Backus, PC

(57) ABSTRACT

Various embodiments relate generally to data science and data analysis and computer software and systems to provide an interface between repositories of disparate datasets and computing machine-based entities that seek access to the datasets, and, more specifically, to a computing and data storage platform configured to transmute associations between data arrangements of different formats or different data models to facilitate data operations, such as queries, configured to enhance, for example, an ingested dataset via transmuted associations as, for example, interrelations among a system of networked collaborative datasets. For example, a method may include identifying a referential indicator, determining an association with a value representative of the referential indicator to an equivalent value representative of another referential indicator associated with a different dataset, transmuting the association to form a transmuted association as a link between the value and the
(Continued)

equivalent value, and integrating the link into an ingested data arrangement.

19 Claims, 12 Drawing Sheets

Related U.S. Application Data a continuation-in-part of application No. 15/186,516, filed on Jun. 19, 2016, now Pat. No. 10,452,677, and a continuation-in-part of application No. 15/454,923, filed on Mar. 9, 2017, now Pat. No. 10,353,911, and a continuation-in-part of application No. 15/927,004, filed on Mar. 20, 2018.

(56) References Cited

U.S. PATENT DOCUMENTS

| | | |
|---|---|---|
| 6,529,909 B1 | 3/2003 | Bowman-Amuah |
| 6,768,986 B2 | 7/2004 | Cras et al. |
| 6,961,728 B2 | 11/2005 | Wynblatt et al. |
| 7,080,090 B2 | 7/2006 | Shah et al. |
| 7,146,375 B2 | 12/2006 | Egilsson et al. |
| 7,680,862 B2 | 3/2010 | Chong et al. |
| 7,761,407 B1 | 7/2010 | Stern |
| 7,836,063 B2 | 11/2010 | Salazar et al. |
| 7,853,081 B2 | 12/2010 | Thint |
| 7,856,416 B2 | 12/2010 | Hoffman et al. |
| 7,877,350 B2 | 1/2011 | Stanfill et al. |
| 7,953,695 B2 | 5/2011 | Roller et al. |
| 7,987,179 B2 | 7/2011 | Ma et al. |
| 8,037,108 B1 | 10/2011 | Chang |
| 8,060,472 B2 | 11/2011 | Itai et al. |
| 8,099,382 B2 | 1/2012 | Liu et al. |
| 8,170,981 B1 | 5/2012 | Tewksbary |
| 8,275,784 B2 | 9/2012 | Cao et al. |
| 8,296,200 B2 | 10/2012 | Mangipudi et al. |
| 8,312,389 B2 | 11/2012 | Crawford et al. |
| 8,429,179 B1 | 4/2013 | Mirhaji |
| 8,521,565 B2 | 8/2013 | Faulkner et al. |
| 8,538,985 B2 | 9/2013 | Betawadkar-Norwood et al. |
| 8,583,631 B1 | 11/2013 | Ganapathi et al. |
| 8,616,443 B2 | 12/2013 | Butt et al. |
| 8,640,056 B2 | 1/2014 | Helfman et al. |
| 8,719,252 B2 | 5/2014 | Miranker et al. |
| 8,762,160 B2 | 6/2014 | Lulla |
| 8,799,240 B2 | 8/2014 | Stowe et al. |
| 8,831,070 B2 | 9/2014 | Huang et al. |
| 8,843,502 B2 | 9/2014 | Elson et al. |
| 8,856,643 B2 | 10/2014 | Drieschner |
| 8,892,513 B2 | 11/2014 | Forsythe |
| 8,935,272 B2 | 1/2015 | Ganti et al. |
| 8,943,313 B2 | 1/2015 | Glew et al. |
| 8,965,915 B2 | 2/2015 | Ganti et al. |
| 8,990,236 B2 | 3/2015 | Mizrahy et al. |
| 8,996,559 B2 | 3/2015 | Ganti et al. |
| 9,002,860 B1 | 4/2015 | Ghemawat |
| 9,218,365 B2 | 12/2015 | Irani et al. |
| 9,244,952 B2 | 1/2016 | Ganti et al. |
| 9,396,283 B2 | 7/2016 | Miranker et al. |
| 9,495,429 B2 | 11/2016 | Miranker |
| 9,560,026 B1 | 1/2017 | Worsley |
| 9,607,042 B2 | 3/2017 | Long |
| 9,613,152 B2 | 4/2017 | Kucera |
| 9,659,081 B1 | 5/2017 | Ghodsi et al. |
| 9,690,792 B2 | 6/2017 | Bartlett et al. |
| 9,696,981 B2 | 7/2017 | Martin et al. |
| 9,710,526 B2 | 7/2017 | Couris et al. |
| 9,710,568 B2 | 7/2017 | Srinivasan et al. |
| 9,720,958 B2 | 8/2017 | Bagehorn et al. |
| 9,760,602 B1 | 9/2017 | Ghodsi et al. |
| 9,769,032 B1 | 9/2017 | Ghodsi et al. |
| 9,798,737 B2 | 10/2017 | Palmer |
| 9,836,302 B1 | 12/2017 | Hunter et al. |
| 9,959,337 B2 | 5/2018 | Ghodsi et al. |
| 9,990,230 B1 | 6/2018 | Stoica et al. |
| 10,095,735 B2 | 10/2018 | Ghodsi et al. |
| 10,102,258 B2 | 10/2018 | Jacob et al. |
| 10,176,234 B2 * | 1/2019 | Gould ................. G06F 16/176 |
| 10,216,860 B2 | 2/2019 | Miranker et al. |
| 10,248,297 B2 | 4/2019 | Beechuk et al. |
| 10,296,329 B2 | 5/2019 | Hunter et al. |
| 10,324,925 B2 | 6/2019 | Jacob et al. |
| 10,346,429 B2 | 7/2019 | Jacob et al. |
| 10,353,911 B2 | 7/2019 | Reynolds et al. |
| 10,361,928 B2 | 7/2019 | Ghodsi et al. |
| 10,438,013 B2 | 10/2019 | Jacob et al. |
| 10,452,677 B2 | 10/2019 | Jacob et al. |
| 10,452,975 B2 | 10/2019 | Jacob et al. |
| 10,474,501 B2 | 11/2019 | Ghodsi et al. |
| 10,474,736 B1 | 11/2019 | Stoica et al. |
| 10,545,986 B2 | 1/2020 | Tappan et al. |
| 10,546,001 B1 * | 1/2020 | Nguyen ................. G06N 20/00 |
| 10,558,664 B2 | 2/2020 | Armbrust et al. |
| 10,606,675 B1 | 3/2020 | Luszczak et al. |
| 10,645,548 B2 * | 5/2020 | Reynolds ................. H04L 63/08 |
| 10,664,509 B1 | 5/2020 | Reeves et al. |
| 10,673,887 B2 | 6/2020 | Crabtree et al. |
| 10,678,536 B2 | 6/2020 | Hunter et al. |
| 10,691,299 B2 | 6/2020 | Broek et al. |
| 10,691,433 B2 | 6/2020 | Shankar et al. |
| 10,769,130 B1 | 9/2020 | Armbrust et al. |
| 10,769,535 B2 | 9/2020 | Lindsley |
| 10,810,051 B1 | 10/2020 | Shankar et al. |
| 2002/0133476 A1 | 9/2002 | Reinhardt |
| 2002/0143755 A1 | 10/2002 | Wynblatt et al. |
| 2003/0093597 A1 | 5/2003 | Marshak et al. |
| 2003/0120681 A1 | 6/2003 | Baclawski |
| 2003/0208506 A1 | 11/2003 | Greenfield et al. |
| 2004/0064456 A1 | 4/2004 | Fong et al. |
| 2005/0004888 A1 | 1/2005 | McCrady et al. |
| 2005/0010550 A1 | 1/2005 | Potter et al. |
| 2005/0010566 A1 | 1/2005 | Cushing et al. |
| 2005/0234957 A1 | 10/2005 | Olson et al. |
| 2005/0246357 A1 | 11/2005 | Geary et al. |
| 2005/0278139 A1 | 12/2005 | Glaenzer et al. |
| 2006/0100995 A1 | 5/2006 | Albornoz et al. |
| 2006/0129605 A1 | 6/2006 | Doshi |
| 2006/0161545 A1 | 7/2006 | Pura |
| 2006/0168002 A1 | 7/2006 | Chesley |
| 2006/0218024 A1 | 9/2006 | Lulla |
| 2006/0235837 A1 | 10/2006 | Chong et al. |
| 2007/0027904 A1 | 2/2007 | Chow et al. |
| 2007/0139227 A1 | 6/2007 | Speirs et al. |
| 2007/0179760 A1 | 8/2007 | Smith |
| 2007/0203933 A1 | 8/2007 | Iversen et al. |
| 2007/0271604 A1 | 11/2007 | Webster et al. |
| 2007/0276875 A1 | 11/2007 | Brunswig et al. |
| 2008/0046427 A1 | 2/2008 | Lee et al. |
| 2008/0091634 A1 | 4/2008 | Seeman |
| 2008/0140609 A1 * | 6/2008 | Werner ................. G06F 16/84 |
| 2008/0162550 A1 | 7/2008 | Fey |
| 2008/0162999 A1 | 7/2008 | Schlueter et al. |
| 2008/0216060 A1 | 9/2008 | Vargas |
| 2008/0240566 A1 | 10/2008 | Thint |
| 2008/0256026 A1 | 10/2008 | Hays |
| 2008/0294996 A1 | 11/2008 | Hunt et al. |
| 2008/0319829 A1 | 12/2008 | Hunt et al. |
| 2009/0006156 A1 | 1/2009 | Hunt et al. |
| 2009/0013281 A1 | 1/2009 | Helfman et al. |
| 2009/0018996 A1 | 1/2009 | Hunt et al. |
| 2009/0064053 A1 | 3/2009 | Crawford et al. |
| 2009/0106734 A1 | 4/2009 | Riesen et al. |
| 2009/0119254 A1 | 5/2009 | Cross et al. |
| 2009/0132474 A1 | 5/2009 | Ma et al. |
| 2009/0132503 A1 | 5/2009 | Sun et al. |
| 2009/0138437 A1 | 5/2009 | Krishnamoorthy et al. |
| 2009/0150313 A1 | 6/2009 | Heilper et al. |
| 2009/0157630 A1 | 6/2009 | Yuan |
| 2009/0182710 A1 | 7/2009 | Short et al. |
| 2009/0198693 A1 | 8/2009 | Pura |
| 2009/0234799 A1 | 9/2009 | Betawadkar-Norwood et al. |
| 2009/0300054 A1 | 12/2009 | Fisher et al. |

(56) References Cited

U.S. PATENT DOCUMENTS

| | | |
|---|---|---|
| 2010/0114885 A1 | 5/2010 | Bowers et al. |
| 2010/0138388 A1* | 6/2010 | Wakeling ............... G06F 16/283 707/634 |
| 2010/0235384 A1 | 9/2010 | Itai et al. |
| 2010/0241644 A1 | 9/2010 | Jackson et al. |
| 2010/0250576 A1 | 9/2010 | Bowers et al. |
| 2010/0250577 A1 | 9/2010 | Cao et al. |
| 2010/0268722 A1 | 10/2010 | Yalamanchi et al. |
| 2010/0332453 A1 | 12/2010 | Prahlad et al. |
| 2011/0153047 A1 | 6/2011 | Cameron et al. |
| 2011/0202560 A1 | 8/2011 | Bowers et al. |
| 2011/0298804 A1 | 12/2011 | Hao et al. |
| 2012/0016895 A1 | 1/2012 | Butt et al. |
| 2012/0036162 A1 | 2/2012 | Gimbel |
| 2012/0102022 A1 | 4/2012 | Miranker et al. |
| 2012/0154633 A1 | 6/2012 | Rodriguez |
| 2012/0179644 A1 | 7/2012 | Miranker |
| 2012/0254192 A1 | 10/2012 | Gelbard |
| 2012/0278902 A1 | 11/2012 | Martin et al. |
| 2012/0284301 A1 | 11/2012 | Mizrahy et al. |
| 2012/0310674 A1 | 12/2012 | Faulkner et al. |
| 2012/0330908 A1 | 12/2012 | Stowe et al. |
| 2012/0330979 A1 | 12/2012 | Elson et al. |
| 2013/0031208 A1 | 1/2013 | Linton et al. |
| 2013/0031364 A1 | 1/2013 | Glew et al. |
| 2013/0041893 A1 | 2/2013 | Strike |
| 2013/0054517 A1 | 2/2013 | Beechuk et al. |
| 2013/0110775 A1 | 5/2013 | Forsythe |
| 2013/0114645 A1 | 5/2013 | Huang et al. |
| 2013/0138681 A1 | 5/2013 | Abrams et al. |
| 2013/0156348 A1 | 6/2013 | Irani et al. |
| 2013/0238667 A1 | 9/2013 | Carvalho et al. |
| 2013/0262443 A1 | 10/2013 | Leida et al. |
| 2013/0263019 A1 | 10/2013 | Castellanos et al. |
| 2013/0321458 A1 | 12/2013 | Miserendino et al. |
| 2014/0006448 A1 | 1/2014 | McCall |
| 2014/0019426 A1 | 1/2014 | Palmer |
| 2014/0067762 A1 | 3/2014 | Carvalho |
| 2014/0115013 A1 | 4/2014 | Anderson |
| 2014/0119611 A1* | 5/2014 | Prevrhal ..................... G06T 7/20 382/107 |
| 2014/0164431 A1* | 6/2014 | Tolbert .................... G06F 16/25 707/770 |
| 2014/0198097 A1 | 7/2014 | Evans |
| 2014/0214857 A1 | 7/2014 | Srinivasan et al. |
| 2014/0229869 A1 | 8/2014 | Chiantera et al. |
| 2014/0244623 A1 | 8/2014 | King |
| 2014/0279640 A1 | 9/2014 | Moreno et al. |
| 2014/0279845 A1 | 9/2014 | Ganti et al. |
| 2014/0280067 A1 | 9/2014 | Ganti et al. |
| 2014/0280286 A1 | 9/2014 | Ganti et al. |
| 2014/0280287 A1 | 9/2014 | Ganti et al. |
| 2014/0337331 A1 | 11/2014 | Hassanzadeh et al. |
| 2014/0337436 A1 | 11/2014 | Hoagland et al. |
| 2014/0372434 A1 | 12/2014 | Smith et al. |
| 2015/0052125 A1 | 2/2015 | Ellis et al. |
| 2015/0081666 A1 | 3/2015 | Long |
| 2015/0095391 A1 | 4/2015 | Gajjar et al. |
| 2015/0120643 A1 | 4/2015 | Dantressangle et al. |
| 2015/0142829 A1 | 5/2015 | Lee et al. |
| 2015/0143248 A1 | 5/2015 | Beechuk et al. |
| 2015/0149879 A1 | 5/2015 | Miller et al. |
| 2015/0186653 A1 | 7/2015 | Gkoulalas-Divanis et al. |
| 2015/0213109 A1 | 7/2015 | Kassko et al. |
| 2015/0234884 A1 | 8/2015 | Henriksen |
| 2015/0242867 A1 | 8/2015 | Prendergast et al. |
| 2015/0269223 A1 | 9/2015 | Miranker et al. |
| 2015/0278273 A1 | 10/2015 | Wigington et al. |
| 2015/0356144 A1 | 12/2015 | Chawla et al. |
| 2015/0372915 A1 | 12/2015 | Shen et al. |
| 2015/0379079 A1 | 12/2015 | Kota |
| 2016/0055184 A1 | 2/2016 | Fokoue-Nkoutche et al. |
| 2016/0055261 A1 | 2/2016 | Reinhardt et al. |
| 2016/0063017 A1 | 3/2016 | Bartlett et al. |
| 2016/0063271 A1 | 3/2016 | Bartlett et al. |
| 2016/0092090 A1 | 3/2016 | Stojanovic et al. |
| 2016/0092474 A1 | 3/2016 | Stojanovic et al. |
| 2016/0092475 A1 | 3/2016 | Stojanovic et al. |
| 2016/0098418 A1 | 4/2016 | Dakshinamurthy et al. |
| 2016/0117362 A1 | 4/2016 | Bagehorn et al. |
| 2016/0132572 A1 | 5/2016 | Chang et al. |
| 2016/0147837 A1 | 5/2016 | Nguyen et al. |
| 2016/0203196 A1 | 7/2016 | Schnall-Levin et al. |
| 2016/0232457 A1 | 8/2016 | Gray et al. |
| 2016/0275204 A1 | 9/2016 | Miranker et al. |
| 2016/0283551 A1 | 9/2016 | Fokoue-Nkoutche et al. |
| 2016/0292206 A1 | 10/2016 | Velazquez et al. |
| 2016/0314143 A1 | 10/2016 | Hiroshige |
| 2016/0321316 A1 | 11/2016 | Pennefather et al. |
| 2016/0322082 A1 | 11/2016 | Davis et al. |
| 2016/0371288 A1 | 12/2016 | Biannic et al. |
| 2016/0371355 A1 | 12/2016 | Massari et al. |
| 2017/0017537 A1 | 1/2017 | Razin et al. |
| 2017/0053130 A1 | 2/2017 | Hughes et al. |
| 2017/0075973 A1 | 3/2017 | Miranker |
| 2017/0132401 A1 | 5/2017 | Gopi et al. |
| 2017/0161323 A1 | 6/2017 | Simitsis et al. |
| 2017/0161341 A1 | 6/2017 | Hrabovsky et al. |
| 2017/0177729 A1 | 6/2017 | Duke et al. |
| 2017/0220615 A1 | 8/2017 | Bendig et al. |
| 2017/0220667 A1 | 8/2017 | Ghodsi et al. |
| 2017/0228405 A1 | 8/2017 | Ward et al. |
| 2017/0236060 A1 | 8/2017 | Ignatyev |
| 2017/0316070 A1 | 11/2017 | Krishnan et al. |
| 2017/0357653 A1 | 12/2017 | Bicer et al. |
| 2017/0364538 A1 | 12/2017 | Jacob et al. |
| 2017/0364539 A1 | 12/2017 | Jacob et al. |
| 2017/0364553 A1 | 12/2017 | Jacob et al. |
| 2017/0364564 A1 | 12/2017 | Jacob et al. |
| 2017/0364568 A1 | 12/2017 | Reynolds et al. |
| 2017/0364569 A1 | 12/2017 | Jacob et al. |
| 2017/0364570 A1 | 12/2017 | Jacob et al. |
| 2017/0364694 A1 | 12/2017 | Jacob et al. |
| 2017/0364703 A1 | 12/2017 | Jacob et al. |
| 2017/0371881 A1 | 12/2017 | Reynolds et al. |
| 2017/0371926 A1 | 12/2017 | Shiran et al. |
| 2018/0025027 A1 | 1/2018 | Palmer |
| 2018/0025307 A1 | 1/2018 | Hui et al. |
| 2018/0032327 A1 | 2/2018 | Adami et al. |
| 2018/0040077 A1 | 2/2018 | Smith et al. |
| 2018/0046668 A1 | 2/2018 | Ghodsi et al. |
| 2018/0048536 A1 | 2/2018 | Ghodsi et al. |
| 2018/0121194 A1 | 5/2018 | Hunter et al. |
| 2018/0210936 A1 | 7/2018 | Reynolds et al. |
| 2018/0262864 A1 | 9/2018 | Reynolds et al. |
| 2018/0300354 A1 | 10/2018 | Liang et al. |
| 2018/0300494 A1 | 10/2018 | Avidan et al. |
| 2018/0314556 A1 | 11/2018 | Ghodsi et al. |
| 2018/0314705 A1 | 11/2018 | Griffith et al. |
| 2018/0314732 A1 | 11/2018 | Armbrust et al. |
| 2018/0330111 A1 | 11/2018 | Käbisch et al. |
| 2019/0005104 A1 | 1/2019 | Prabhu et al. |
| 2019/0034491 A1 | 1/2019 | Griffith et al. |
| 2019/0050445 A1 | 2/2019 | Griffith et al. |
| 2019/0050459 A1 | 2/2019 | Griffith et al. |
| 2019/0057107 A1 | 2/2019 | Bartlett et al. |
| 2019/0065567 A1 | 2/2019 | Griffith et al. |
| 2019/0065569 A1 | 2/2019 | Boutros et al. |
| 2019/0066052 A1 | 2/2019 | Boutros et al. |
| 2019/0079968 A1 | 3/2019 | Griffith et al. |
| 2019/0095472 A1 | 3/2019 | Griffith |
| 2019/0121807 A1 | 4/2019 | Boutros et al. |
| 2019/0155852 A1 | 5/2019 | Miranker et al. |
| 2019/0258479 A1 | 8/2019 | Hunter et al. |
| 2019/0266155 A1 | 8/2019 | Jacob et al. |
| 2019/0272279 A1 | 9/2019 | Jacob et al. |
| 2019/0295296 A1 | 9/2019 | Gove, Jr. |
| 2019/0317961 A1 | 10/2019 | Brener et al. |
| 2019/0332606 A1 | 10/2019 | Kee et al. |
| 2019/0347244 A1 | 11/2019 | Jacob et al. |
| 2019/0347258 A1 | 11/2019 | Jacob et al. |
| 2019/0347259 A1 | 11/2019 | Jacob et al. |
| 2019/0347268 A1 | 11/2019 | Griffith |
| 2019/0347347 A1 | 11/2019 | Griffith |

(56) References Cited

U.S. PATENT DOCUMENTS

| | | |
|---|---|---|
| 2019/0370230 A1 | 12/2019 | Jacob et al. |
| 2019/0370262 A1 | 12/2019 | Reynolds et al. |
| 2019/0370266 A1 | 12/2019 | Jacob et al. |
| 2019/0370481 A1 | 12/2019 | Jacob et al. |
| 2020/0073644 A1 | 3/2020 | Shankar et al. |
| 2020/0073865 A1 | 3/2020 | Jacob et al. |
| 2020/0074298 A1 | 3/2020 | Jacob et al. |
| 2020/0097504 A1 | 3/2020 | Sequeda et al. |
| 2020/0117665 A1 | 4/2020 | Jacob et al. |
| 2020/0117688 A1 | 4/2020 | Sequeda et al. |
| 2020/0175012 A1 | 6/2020 | Jacob et al. |
| 2020/0175013 A1 | 6/2020 | Jacob et al. |
| 2020/0201854 A1 | 6/2020 | Miller |
| 2020/0218723 A1 | 7/2020 | Jacob et al. |
| 2020/0241950 A1 | 7/2020 | Luszczak et al. |
| 2020/0252766 A1 | 8/2020 | Reynolds et al. |
| 2020/0252767 A1 | 8/2020 | Reynolds et al. |
| 2020/0257689 A1 | 8/2020 | Armbrust et al. |
| 2020/0301684 A1 | 9/2020 | Shankar et al. |
| 2020/0409768 A1 | 12/2020 | Shankar et al. |
| 2021/0011901 A1 | 1/2021 | Armbrust et al. |
| 2021/0019327 A1 | 1/2021 | Reynolds et al. |

FOREIGN PATENT DOCUMENTS

| | | | |
|---|---|---|---|
| EP | 2631817 A1 | 8/2013 | |
| EP | 2631819 A1 | 8/2013 | |
| EP | 2685394 A3 | 6/2017 | |
| GB | 2519779 A | 5/2015 | |
| JP | 2013175181 A | 9/2013 | |
| JP | 2013246828 A | 12/2013 | |
| WO | 2012054860 A1 | 4/2012 | |
| WO | 2017190153 A1 | 11/2017 | |
| WO | 2017222927 A1 | 12/2017 | |
| WO | 2018156551 A1 | 8/2018 | |
| WO | 2018164971 A1 | 9/2018 | |

OTHER PUBLICATIONS

Boutros et al., "Computerized Tools to Facilitate Data Project Development via Data Access Layering Logic in a Networked Computing Platform Including Collaborative Datasets," U.S. Appl. No. 15/985,704, filed May 22, 2018.

Boutros et al., "Dynamic Composite Data Dictionary to Facilitate Data Operations via Computerized Tools Configured to Access Collaborative Datasets in a Networked Computing Platform," U.S. Appl. No. 15/985,705, filed May 22, 2018.

Boutros et al., "Graphical User Interface for a Display Screen or Portion Thereof," U.S. Appl. No. 29/648,465, filed May 22, 2018.

Boutros et al., "Graphical User Interface for a Display Screen or Portion Thereof," U.S. Appl. No. 29/648,466, filed May 22, 2018.

Boutros et al., "Graphical User Interface for a Display Screen or Portion Thereof," U.S. Appl. No. 29/648,467, filed May 22, 2018.

Bullock, Joshua, Non-Final Office Action dated Jun. 28, 2018 for U.S. Appl. No. 15/439,908.

Bullock, Joshua, Non-Final Office Action dated Jun. 28, 2018 for U.S. Appl. No. 15/439,911.

Copenheaver, Blaine R., Notification of Transmittal of the International Search Report and the Written Opinion of the International Searching Authority, or the Declaration dated Jul. 5, 2017 for International Patent Application No. PCT/US2017/030474.

Hoang, Hau Hai, Non-Final Office Action dated May 3, 2018 for U.S. Appl. No. 15/186,515.

Joshi, Amit Krishna et al., "Alignment-based Querying of Linked Open Data," Lecture Notes in Computer Science, 7566, 807-824, 2012.

Kahn, Yasar et al., "SAFE: Policy Aware SPARQL Query Federation Over RDF Data Cubes," Proceedings of the 7th International Workshop on Semantic Web Applications and Tools for Life Sciences, Berlin, Germany, Dec. 9-11, 2014.

Krishnan et al., U.S. Appl. No. 15/583,966, filed May 1, 2017 and titled "Automatic Generation of Structured Data from Semi-Structured Data."

Martin et al., U.S. Appl. No. 13/457,925, filed Apr. 27, 2012 and titled "Incremental Deployment of Computer Software Program Logic."

Martin et al., U.S. Appl. No. 61/479,621, filed Apr. 27, 2011 and titled "Incremental Deployment of Computer Software Program Logic."

Nguyen, Kim T., Non-Final Office Action dated Jun. 14, 2018 for U.S. Appl. No. 15/186,514.

Parashar et al., U.S. Appl. No. 62/329,982, filed Apr. 29, 2016 and titled "Automatic Parsing of Semi-Structured Data and Identification of Missing Delimiters."

Raab, Christopher J., Non-Final Office Action dated Jun. 28, 2018 for U.S. Appl. No. 15/186,520.

Skevakis, Giannis et al., Metadata management, interoperability and Linked Data publishing support for Natural History Museums, Int J Digit Libr (2014), published online: Apr. 11, 2014; Springer-Verlag Berlin Heidelberg.

Young, Lee W., Notification of Transmittal of the International Search Report and the Written Opinion of the International Searching Authority, or the Declaration dated May 29, 2018 for International Patent Application No. PCT/US2018/018906.

"Data.World Comes Out of Stealth to Make Open Data Easier." Americaninno.com, AustinInno, Jul. 11, 2016, www.americaninno.com/austin/open-data-tech-brett-hurts-startup-data-world-launches/.

Dwivedi, Mahesh H., Non-Final Office Action dated Jan. 30, 2020 for U.S. Appl. No. 15/454,955.

Gillin, Paul, "Neo4j Connector Integrates Graph Data With Business Intelligence Tools," SiliconANGLE, Published Mar. 24, 2020, Retrieved from on Mar. 25, 2020.

Woo, Isaac M., Non-Final Office Action dated May 5, 2020 for U.S. Appl. No. 16/137,292.

Yotova, Polina, Supplementary European Search Report and Examiner Search Opinion for European Patent Application No. 17815970.3, dated Feb. 21, 2020.

Griffith et al., "Aggregation of Ancillary Data Associated With Source Data in a System of Networked Collaborative Datasets," U.S. Appl. No. 15/927,006, filed Mar. 20, 2018.

Griffith et al., "Data Ingestion to Generate Layered Dataset Interrelations to Form a System of Networked Collaborative Datasets," U.S. Appl. No. 15/926,999, filed Mar. 20, 2018.

Griffith et al., "Layered Data Generation and Data Remediation to Facilitate Formation of Interrelated Data in a System of Networked Collaborative Datasets," U.S. Appl. No. 15/927,004, filed Mar. 20, 2018.

Griffith et al., "Link-Formative Auxiliary Queries Applied at Data Ingestion to Facilitate Data Operations in a System of Networked Collaborative Datasets," U.S. Appl. No. 15/943,633, filed Apr. 2, 2018.

Jacob et al., "Platform Management of Integrated Access of Public and Privately-Accessible Datasets Utilizing Federated Query Generation and Schema Rewriting Optimization," International Patent Application No. PCT/US2018/018906 filed Feb. 21, 2018.

Reynolds et al., "Computerized Tool Implementation of Layered Data Files to Discover, Form, or Analyze Dataset Interrelations of Networked Collaborative Datasets," U.S. Appl. No. 15/454,981, filed Mar. 9, 2017.

Reynolds et al., "Computerized Tools to Discover, Form, and Analyze Dataset Interrelations Among a System of Networked Collaborative Datasets," International Patent Application No. PCT/US2018/020812 filed Mar. 3, 2018.

Reynolds et al., "Interactive Interfaces to Present Data Arrangement Overviews and Summarized Dataset Attributes for Collaborative Datasets," U.S. Appl. No. 15/454,969, filed Mar. 9, 2017.

Young, Lee W., International Searching Authority, Notification of Transmittal of the International Search Report and the Written Opinion of the International Searching Authority, or the Declaration for International Patent Application No. PCT/US2017/037846, dated Nov. 9, 2017.

(56) References Cited

OTHER PUBLICATIONS

Angles, R., Gutierrez. C., "The Expressive Power of SPARQL," Proceedings of the 7th International Semantic Web Conference (ISWC2008). 2008.
Arenas, M., et al., "A Direct Mapping of Relational Data to RDF," W3C Recommendation, Sep. 27, 2012, Retrieved from the Internet [retrieved Mar. 7, 2019].
Beckett, D., Berners-Lee, T., "Turtle—Terse RDF Triple Language," W3C Team Submission, Jan. 14, 2008, Retrieved from the Internet [retrieved Mar. 7, 2019].
Beckett, D., Broekstra, J., "SPARQL Query Results XML Format," W3C Recommendation, Jan. 15, 2008, Retrieved from the Internet [retrieved Mar. 7, 2019].
Beckett, Dave, "RDF/XML Syntax Specification (Revised)," W3C Recommendation, Feb. 10, 2004, Retrieved from the Internet [retrieved Mar. 7, 2019].
Berners-Lee, Tim, "Notation 3," 2006, Retrieved from the Internet [retrieved on Mar. 7, 2019].
Berners-Lee, Tim, "Linked Data," 2009, Retrieved from the Internet [retrieved on Mar. 7, 2019].
Brener et al., "Computerized Tools Configured to Determine Subsets of Graph Data Arrangements for Linking Relevant Data to Enrich Datasets Associated With a Data-Driven Collaborative Dataset Platform," U.S. Appl. No. 16/395,036, filed Apr. 25, 2019.
Brickley, D., Guha, R.V., "RDF Vocabulary Description Language 1.0: RDF Schema," W3C Recommendation, Feb. 10, 2004, Retrieved from the Internet [retrieved Mar. 7, 2019].
Buche et al., "Flexible SPARQL Querying of Web Data Tables Driven by an Ontology," FQAS 2009, LNAI 5822, Springer, 2009, pp. 345-357.
Bullock, Joshua, Final Office Action dated Jan. 22, 2019 for U.S. Appl. No. 15/439,908.
Bullock, Joshua, Final Office Action dated Jan. 22, 2019 for U.S. Appl. No. 15/439,911.
Clark, K., Feigenbaum, L., Torres, E., "SPARQL Protocol for RDF," W3C Recommendation, Jan. 15, 2008, Retrieved from the Internet [retrieved Mar. 7, 2019].
Czajkowski, K., et al., "Grid Information Services for Distributed Resource Sharing," 10th IEEE International Symposium on High Performance Distributed Computing, pp. 181-184. IEEE Press, New York (2001).
Dean, M., Schreiber, G., "OWL Web Ontology Language Reference," W3C Recommendation, Feb. 10, 2004, Retrieved from the Internet [retrieved Mar. 7, 2019].
Feigenbaum, L., et al., "Semantic Web in Action," Scientific American, pp. 90-97, Dec. 2007.
Fernandez, J., et al., "Lightweighting the Web of Data through Compact RDF/HDT," Lozano J.A., Moreno J.A. (eds) Advances in Artificial Intelligence. CAEPIA 2011. Lecture Notes in Computer Science, vol. 7023. Springer, Berlin, Hidelberg.
Foster, I., Kesselman, C., "The Grid: Blueprint for a New Computing Infrastructure," Morgan Kaufmann, San Francisco (1999).
Foster, I., Kesselman, C., Nick, J., Tuecke, S., "The Physiology of the Grid: An Open Grid Services Architecture for Distributed Systems Integration," Technical Report, Global Grid Forum (2002).
Ganti et al., U.S. Appl. No. 14/058,184, filed Oct. 18, 2013 and entitled, "Assisted Query Formation, Validation, and Result Previewing in a Database Having a Complex Schema."
Ganti et al., U.S. Appl. No. 14/058,189, filed Oct. 18, 2013 and entitled, "Assisted Query Formation, Validation, and Result Previewing in a Database Having a Complex Schema."
Ganti et al., U.S. Appl. No. 14/058,206, filed Oct. 18, 2013 and entitled, "Curated Answers Community Automatically Populated Through User Query Monitoring."
Ganti et al., U.S. Appl. No. 61/802,716, filed Mar. 17, 2013 and entitled, "Data Profile Driven Query Builder."
Ganti et al., U.S. Appl. No. 61/802,742, filed Mar. 18, 2013 and entitled, "Developing a Social Data Catalog by Crowd-Sourcing."
Ganti et al., U.S. Appl. No. 61/802,743, filed Mar. 18, 2013 and entitled, "Creating a Data Catalog by Mining Queries."
Ganti et al., U.S. Appl. No. 61/802,744, filed Mar. 18, 2013 and entitled, "Auto-Completion of Queries With Data Object Names and Data Profiles."
Garcia-Molina, H., Ullman, J., Widom, J., Database Systems: The Complete Book. Editorial Pearson Prentice Hall. Second Edition.
Gawinecki, Maciej, "How schema mapping can help in data integration?—integrating the relational databases with ontologies," ITC School, Computer Science, XXIII Cycle DII, University of Modena and Reggio Emilia, Italy, 2008.
Girma, Anteneh B., Final Office Action for U.S. Appl. No. 13/278,907, dated Apr. 18, 2013.
Girma, Anteneh B., Non-Final Office Action for U.S. Appl. No. 13/278,907, dated Jul. 25, 2012.
Grant, J., Beckett, D., "RDF Test Cases," W3C Recommendation, Feb. 10, 2004, Retrieved from the Internet [retrieved Mar. 7, 2019].
Hayes, Patrick, "RDF Semantics," W3C Recommendation, Feb. 10, 2004, Retrieved from the Internet [retrieved Mar. 7, 2019].
Heflin, J., "OWL Web Ontology Language Use Cases and Requirements," W3C Recommendation, Feb. 10, 2004, Retrieved from the Internet [retrieved Mar. 7, 2019].
Hoang, Hau Hai, Final Office Action dated Nov. 26, 2018 for U.S. Appl. No. 15/186,515.
Hoang, Hau Hai, Non-Final Office Action dated Apr. 16, 2019 for U.S. Appl. No. 15/186,515.
Htay, Lin Lin M., Notice of Allowance and Fee(s) Due and Notice of Allowability for U.S. Appl. No. 15/186,516, dated Jan. 25, 2019.
Hu, Xiaoqin, Final Office Action dated Apr. 5, 2019 for U.S. Appl. No. 15/454,969.
Hu, Xiaoqin, Final Office Action dated Apr. 5, 2019 for U.S. Appl. No. 15/454,981.
Hu, Xiaoqin, Non-Final Office Action for U.S. Appl. No. 15/454,969 dated Dec. 7, 2018.
Hu, Xiaoqin, Non-Final Office Action for U.S. Appl. No. 15/454,981 dated Dec. 12, 2018.
J. Perez, M. Arenas, C. Gutierrez, "Semantics and Complexity of SPARQL," ACM Transactions on Database Systems (TODS), Vo. 34, No. 3, Article 16, Publication Date: Aug. 2009.
Jacob et al., "Collaborative Dataset Consolidation Via Distributed Computer Networks," U.S. Appl. No. 16/287,967, filed Feb. 27, 2019.
Jacob et al., "Dataset Analysis and Dataset Attribute Inferencing to Form Collaborative Datasets," U.S. Appl. No. 16/292,120, filed Mar. 4, 2019.
Langedgger, Andreas, "XL Wrap—Spreadsheet-to-RDF Wrapper," 2009, Retrieved from the Internet [retrieved Mar. 7, 2019].
Lee, Mark B., Non-Final Office Action for U.S. Appl. No. 13/180,444 dated Jul. 2, 2012.
Lenz, H.J., Shoshani, A., "Summarizability in OLAP and Statistical Data Bases," Proceedings of the Ninth International Conference on Scientific and Statistical Database Management, 1997.
Manola, F., Miller, E., "RDF Primer," W3C Recommendation, Feb. 10, 2004, Retrieved from the Internet [retrieved Mar. 7, 2019].
May, P., Ehrlich, H.C., Steinke, T., "ZIB Structure Prediction Pipeline: Composing a Complex Biological Workflow through Web Services," In: Nagel, W.E., Walter, W.V., Lehner, W. (eds.) Euro-Par 2006. LNCS, vol. 4128, pp. 1148-1158. Springer, Heidelberg (2006).
McGuiness, D., Van Harmelen, F., "OWL Web Ontology Language Overview," W3C Recommendation, Feb. 10, 2004, Retrieved from the Internet [retrieved Mar. 7, 2019].
Miranker, Daniel Paul, "Accessing Relational Databases as Resource Description Framework Databases," U.S. Appl. No. 61/406,021, filed Oct. 22, 2010.
Miranker, Daniel Paul, "Automatic Synthesis and Presentation of OLAP Cubes from Semantically Enriched Data Sources," U.S. Appl. No. 61/362,781, filed Jul. 9, 2010.
National Center for Biotechnology Information, Website, Retrieved from the Internet [retrieved Mar. 7, 2019].
Nguyen, Kim T., Non-Final Office Action dated Mar. 20, 2019 for U.S. Appl. No. 15/454,923.
Niinimaki et al., "An ETL Process for OLAP Using RDF/OWL Ontologies," Journal on Data Semantics XIII, LNCS 5530, Springer, pp. 97-119, Aug. 12, 2009.

(56) References Cited

OTHER PUBLICATIONS

Patel-Schneider, P., Hayes, P., Horrocks, I., "OWL Web Ontology Language Semantics and Abstract Syntax," W3C Recommendation, Feb. 10, 2004, Retrieved from the Internet [retrieved Mar. 7, 2019].
Perez, J., Arenas, M., Gutierrez, C., "Semantics and Complexity of SPARQL," In Proceedings of the International Semantic Web Conference (ISWC2006). 2006.
Prud'hommeaux, E., Seaborne, A., "SPARQL Query Language for RDF," W3C Recommendation, Jan. 15, 2008, Retrieved from the Internet [retrieved Mar. 7, 2019].
Raab, Christopher J., Notice of Allowance and Fee(s) Due and Notice of Allowability for U.S. Appl. No. 15/186,520, dated Jan. 2, 2019.
RDB2RDF Working Group Charter, Sep. 2009, Retrieved from the Internet [retrieved Mar. 7, 2019].
Sahoo, S., et al., "A Survey of Current Approaches for Mapping of Relational Databases to RDF," W3C RDB2RDF XG Report, Incubator Group, Published Jan. 8, 2009.
Sequeda, J., Depena, R., Miranker. D., "Ultrawrap: Using SQL Views for RDB2RDF," Poster in the 8th International Semantic Web Conference (ISWC2009), Washington DC, US, 2009.
Sequeda, J., et al., "Direct Mapping SQL Databases to the Semantic Web," Technical Report 09-04. The University of Texas at Austin, Department of Computer Sciences. 2009.
Sequeda, J., et al., "Ultrawrap: SPARQL Execution on Relational Data," Technical Report. The University of Texas at Austin, Department of Computer Sciences. 2012.
Sequeda, J., Tirmizi, S., Miranker, D., "SQL Databases are a Moving Target," Position Paper for W3C Workshop on RDF Access to Relational Databases, Cambridge, MA, USA, 2007.
Smith, M., Welty, C., McGuiness, D., "OWL Web Ontology Language Guide," W3C Recommendation, Feb. 10, 2004, Retrieved from the Internet [retrieved Mar. 7, 2019].
Smith, T.F., Waterman, M.S., "Identification of Common Molecular Subsequences," J. Mol. Biol. 147, 195-197 (1981).
Tirmizi, S., Sequeda, J., Miranker, D., "Translating SQL Applications to the Semantic Web," In Proceedings of the 19th International Databases and Expert Systems Application Conference (DEXA2008). Turin, Italy. 2008.
U.S. Appl. No. 16/251,408, filed Jan. 18, 2019.
Ultrawrap Mapper, U.S. Appl. No. 62/169,268, filed Jun. 1, 2015 (Expired).
Vy, Hung T., Final Office Action for U.S. Appl. No. 13/180,444 dated Dec. 3, 2014.
Vy, Hung T., Final Office Action for U.S. Appl. No. 13/180,444 dated Dec. 9, 2015.
Vy, Hung T., Final Office Action for U.S. Appl. No. 13/180,444 dated Feb. 22, 2013.
Vy, Hung T., Non-Final Office Action for U.S. Appl. No. 13/180,444 dated Jun. 18, 2015.
Vy, Hung T., Non-Final Office Action for U.S. Appl. No. 13/180,444 dated Mar. 26, 2014.
Vy, Hung T., Non-Final Office Action for U.S. Appl. No. 15/273,930 dated Dec. 20, 2017.
Yen, Syling, Final Office Action dated Apr. 10, 2019 for U.S. Appl. No. 15/186,519.
Yen, Syling, Non-Final Office Action dated Feb. 8, 2019 for U.S. Appl. No. 15/186,519.
Young, Lee W., Notification of Transmittal of the International Search Report and the Written Opinion of the International Searching Authority, or the Declaration for International Application No. PCT/US2011/057334, dated Mar. 22, 2012.
Jacob et al., "Dataset Analysis and Dataset Attribute Inferencing to Form Collaborative Datasets," U.S. Appl. No. 16/271,263, filed Feb. 8, 2019.
Jacob et al., "Management of Collaborative Datasets via Distributed Computer Networks," U.S. Appl. No. 16/271,687, filed Feb. 8, 2019.
Jacob et al., "Management of Collaborative Datasets via Distributed Computer Networks," U.S. Appl. No. 16/292,135, filed Mar. 4, 2019.
Jacob et al., "Query Generation for Collaborative Datasets," U.S. Appl. No. 16/395,043, filed Apr. 25, 2019.
Jacob et al., "Query Generation for Collaborative Datasets," U.S. Appl. No. 16/395,049, filed Apr. 25, 2019.
Khong, Alexander, Non-Final Office Action for U.S. Appl. No. 15/165,775, dated Jun. 14, 2018.
Klyne, G., Carroll, J., "Resource Description Framework (RDF): Concepts and Abstract Syntax," W3C Recommendation, Feb. 10, 2004, Retrieved from the Internet [retrieved Mar. 7, 2019].
Hoang, Hau Hai, Final Office Action dated Jul. 30, 2019 for U.S. Appl. No. 15/186,515.
Hu, Xiaoqin, Final Office Action dated Oct. 31, 2019 for U.S. Appl. No. 15/454,969.
Hu, Xiaoqin, Final Office Action dated Sep. 24, 2019 for U.S. Appl. No. 15/454,981.
Hu, Xiaoqin, Non-Final Office Action dated Aug. 1, 2019 for U.S. Appl. No. 15/454,981.
Hu, Xiaoqin, Non-Final Office Action dated Jul. 26, 2019 for U.S. Appl. No. 15/454,969.
Nguyen, Kim T., Notice of Allowance and Fee(s) Due, dated May 15, 2019 for U.S. Appl. No. 15/454,923.
Yen, Syling, Final Office Action dated Oct. 25, 2019 for U.S. Appl. No. 15/186,519.
Yen, Syling, Non-Final Office Action dated Sep. 12, 2019 for U.S. Appl. No. 15/186,519.
Bullock, Joshua, Final Office Action dated Oct. 30, 2018 for U.S. Appl. No. 15/186,517.
Bullock, Joshua, Non-Final Office Action dated Jul. 12, 2018 for U.S. Appl. No. 15/186,517.
Ganti et al., U.S. Appl. No. 14/058,208, filed Oct. 18, 2013 and Entitled, "Editable and Searchable Markup Pages Automatically Populated Through User Query Monitoring."
Griffith et al., "Extended Computerized Query Language Syntax for Analyzing Multiple Tabular Data Arrangements in Data-Driven Collaborative Projects," U.S. Appl. No. 16/036,834, filed Jul. 16, 2018.
Griffith et al., "Localized Link Formation to Perform Implicitly Federated Queries Using Extended Computerized Query Language Syntax," U.S. Appl. No. 16/036,836, filed Jul. 16, 2018.
Griffith, David Lee, "Determining a Degree of Similarity of a Subset of Tabular Data Arrangements to Subsets of Graph Data Arrangements at Ingestion Into a Data-Driven Collaborative Dataset Platform," U.S. Appl. No. 16/137,297, filed Sep. 20, 2018.
Griffith, David Lee, "Matching Subsets of Tabular Data Arrangements to Subsets of Graphical Data Arrangements at Ingestion Into Data Driven Collaborative Datasets," U.S. Appl. No. 16/137,292, filed Sep. 20, 2018.
Griffith, David Lee, "Predictive Determination of Constraint Data for Application With Linked Data in Graph-Based Datasets Associated With a Data-Driven Collaborative Dataset Platform," U.S. Appl. No. 16/139,374, filed Sep. 24, 2018.
Haveliwala et al., "Evaluating Strategies for Similarity Search on the Web," Proceedings of the 11th international conference on World Wide Web, May 7-11, 2002, Honolulu, Hawaii, USA (ACM), p. 432-442.
Htay, Lin Lin M., Non-Final Office Action dated Sep. 14, 2018 for U.S. Appl. No. 15/186,516.
Jacob et al., "Collaborative Dataset Consolidation via Distributed Computer Networks," U.S. Appl. No. 16/120,057, filed Aug. 31, 2018.
Pandit et al., "Using Ontology Design Patterns to Define SHACL Shapes," CEUR Workshop Proceedings, Proceedings of the 9th Workshop on Ontology Design and Patterns (WOP 2018), Monterey, USA, Oct. 9, 2018.
Young, Lee W., International Searching Authority, Notification of Transmittal of the International Search Report and the Written Opinion of the International Searching Authority, or the Declaration for International Patent Application No. PCT/US2018/020812, dated Aug. 8, 2018.

(56) References Cited

OTHER PUBLICATIONS

Young, Lee W., Invitation to Pay Additional Fees and, Where Applicable, Protest Fee, dated Jun. 14, 2018 for International Application No. PCT/US2018/020812.
U.S. Appl. No. 15/186,514, filed Jun. 19, 2016, now U.S. Pat. No. 10,102,258.
U.S. Appl. No. 15/186,515, filed Jun. 19, 2018.
U.S. Appl. No. 15/186,516, filed Jun. 19, 2016.
U.S. Appl. No. 15/186,517, filed Jun. 19, 2016.
U.S. Appl. No. 15/186,519, filed Jun. 19, 2016.
U.S. Appl. No. 15/186,520, filed Jun. 19, 2016.
U.S. Appl. No. 15/439,908, filed Feb. 22, 2017.
U.S. Appl. No. 15/439,911, filed Feb. 22, 2017.
U.S. Appl. No. 15/454,923, filed Mar. 9, 2017.
U.S. Appl. No. 15/454,955, filed Mar. 9, 2017.
U.S. Appl. No. 15/454,969, filed Mar. 9, 2017.
U.S. Appl. No. 15/454,981, filed Mar. 9, 2017.
U.S. Appl. No. 15/926,999, filed Mar. 20, 2018.
U.S. Appl. No. 15/943,633, filed Apr. 2, 2018.
U.S. Appl. No. 15/927,004, filed Mar. 20, 2018.
U.S. Appl. No. 15/927,006, filed Mar. 20, 2018.
U.S. Appl. No. 15/985,702, filed May 22, 2018.
U.S. Appl. No. 15/985,704, filed May 22, 2018.
U.S. Appl. No. 15/985,705, filed May 22, 2018.
U.S. Appl. No. 29/648,465, filed May 22, 2018.
U.S. Appl. No. 29/648,466, filed May 22, 2018.
U.S. Appl. No. 29/648,467, filed May 22, 2018.
U.S. Appl. No. 16/036,834, filed Jul. 16, 2018.
U.S. Appl. No. 16/036,836, filed Jul. 16, 2018.
U.S. Appl. No. 16/120,057, filed Aug. 31, 2018.
U.S. Appl. No. 16/137,292, filed Sep. 20, 2018.
U.S. Appl. No. 16/137,297, filed Sep. 20, 2018.
U.S. Appl. No. 16/139,374, filed Sep. 24, 2018.
U.S. Appl. No. 16/271,263, filed Feb. 8, 2019.
U.S. Appl. No. 16/271,687, filed Feb. 8, 2019.
U.S. Appl. No. 16/287,967, filed Feb. 27, 2019.
U.S. Appl. No. 16/292,120, filed Mar. 4, 2019.
U.S. Appl. No. 16/292,135, filed Mar. 4, 2019.
U.S. Appl. No. 16/395,036, filed Apr. 25, 2019.
U.S. Appl. No. 16/395,043, filed Apr. 25, 2019.
U.S. Appl. No. 16/395,049, filed Apr. 25, 2019.
U.S. Appl. No. 16/404,113, filed May 6, 2019.
U.S. Appl. No. 16/428,456, filed May 31, 2019.
U.S. Appl. No. 16/428,915, filed May 31, 2019.
U.S. Appl. No. 16/457,750, filed Jun. 28, 2019.
U.S. Appl. No. 16/457,755, filed Jun. 28, 2019.
U.S. Appl. No. 16/457,759, filed Jun. 28, 2019.
U.S. Appl. No. 16/457,766, filed Jun. 28, 2019.
U.S. Appl. No. 16/697,130, filed Nov. 26, 2019.
U.S. Appl. No. 16/697,132, filed Nov. 26, 2019.
U.S. Appl. No. 16/732,261, filed Dec. 31, 2019.
U.S. Appl. No. 16/732,263, filed Dec. 31, 2019.
U.S. Appl. No. 16/899,542, filed Jun. 11, 2020.
U.S. Appl. No. 16/899,544, filed Jun. 11, 2020.
U.S. Appl. No. 16/899,547, filed Jun. 11, 2020.
U.S. Appl. No. 16/899,549, filed Jun. 11, 2020.
U.S. Appl. No. 16/899,551, filed Jun. 11, 2020.
U.S. Appl. No. 16/917,228, filed Jun. 30, 2020.
U.S. Appl. No. 17/004,570, filed Aug. 27, 2020.
U.S. Appl. No. 17/037,005, filed Sep. 29, 2020.
U.S. Appl. No. 17/114,377, filed Dec. 7, 2020.
U.S. Appl. No. 17/114,385, filed Dec. 7, 2020.
Alaoui et al., "SQL to SPARQL Mapping for RDF querying based on a new Efficient Schema Conversion Technique," International Journal of Engineering Research & Technology (IJERT); ISSN: 2278-0181; vol. 4 Issue 10, Oct. 1, 2015, Retrieved from internet: „https://www.ijert.org/research/sql-to-sparql-mapping-for-rdf-querying-based-on-a-new-efficient-schema-conversion-technique-IJERTV4I81--1-5.pdf>> Retrieved on Oct. 6, 2020.
Doung, Hien, Non-Final Office Action dated Dec. 9, 2020 for U.S. Appl. No. 16/899,544.
Ellis, Matthew J., Non-Final Office Action dated Sep. 25, 2020 for U.S. Appl. No. 16/139,374.
European Patent Office, Extended European Search Report for European Patent Application No. 18757122.9 dated Oct. 15, 2020.
European Patent Office, Extended European Search Report for European Patent Application No. 18763855.6 dated Sep. 28, 2020.
Nguyen, Kim T., Non-Final Office Action dated Dec. 10, 2020 for U.S. Appl. No. 16/137,297.
Nguyen, Kim T., Non-Final Office Action dated Dec. 8, 2020 for U.S. Appl. No. 15/985,704.
Nguyen, Kim T., Non-Final Office Action dated Nov. 24, 2020 for U.S. Appl. No. 16/036,834.
Nguyen, Kim T., Non-Final Office Action dated Nov. 24, 2020 for U.S. Appl. No. 16/036,836.
Nguyen, Kim T., Non-Final Office Action dated Nov. 27, 2020 for U.S. Appl. No. 15/985,705.
Nguyen, Kim T., Non-Final Office Action dated Oct. 14, 2020 for U.S. Appl. No. 15/943,629.
Nguyen, Kim T., Non-Final Office Action dated Oct. 14, 2020 for U.S. Appl. No. 15/943,633.
Nguyen, Kim T., Non-Final Office Action dated Oct. 27, 2020 for U.S. Appl. No. 15/985,702.
Nguyen, Kim T., Non-Final Office Action dated Oct. 5, 2020 for U.S. Appl. No. 15/927,004.
Nguyen, Kim T., Non-Final Office Action dated Oct. 5, 2020 for U.S. Appl. No. 15/927,006.
Nguyen, Kim T., Non-Final Office Action dated Sep. 21, 2020 for U.S. Appl. No. 15/926,999.
Raab, Christopher J., Non-Final Office Action dated Jul. 24, 2020 for U.S. Appl. No. 16/271,687.
Raab, Christopher J., Non-Final Office Action dated Oct. 16, 2020 for U.S. Appl. No. 16/287,967.
Rachapalli et al., "RETRO: A Framework for Semantics Preserving SQL-to-SPARQL Translation," The University of Texas at Dallas; Sep. 18, 2011, XP055737294, Retrieved from internet: <> Retrieved on Oct. 6, 2020.
Uddin, MD I., Final Office Action dated Jan. 1, 2021 for U.S. Appl. No. 16/404,113.
Uddin, MD I., Non-Final Office Action dated Oct. 6, 2020 for U.S. Appl. No. 16/404,113.

\* cited by examiner

TRANSMUTING DATA ASSOCIATIONS AMONG DATA ARRANGEMENTS TO FACILITATE DATA OPERATIONS IN A SYSTEM OF NETWORKED COLLABORATIVE DATASETS

CROSS-REFERENCE TO APPLICATIONS

This application is a continuation-in-part application of U.S. patent application Ser. No. 15/186,514, filed on Jun. 19, 2016, and titled "COLLABORATIVE DATASET CONSOLIDATION VIA DISTRIBUTED COMPUTER NETWORKS," U.S. patent application Ser. No. 15/186,516, filed on Jun. 19, 2016, and titled "DATASET ANALYSIS AND DATASET ATTRIBUTE INFERENCING TO FORM COLLABORATIVE DATASETS," U.S. patent application Ser. No. 15/454,923, filed on Mar. 9, 2017, and titled "COMPUTERIZED TOOLS TO DISCOVER, FORM, AND ANALYZE DATASET INTERRELATIONS AMONG A SYSTEM OF NETWORKED COLLABORATIVE DATASETS," and U.S. patent application Ser. No. 15/927,004 filed on Mar. 20, 2018, and titled "LAYERED DATA GENERATION AND DATA REMEDIATION TO FACILITATE FORMATION OF INTERRELATED DATA IN A SYSTEM OF NETWORKED COLLABORATIVE DATASETS," all of which is herein incorporated by reference in its entirety for all purposes. This application is also related to U.S. patent application Ser. No. 15/943,633, filed on Apr. 2, 2018, and titled "LINK-FORMATIVE QUERIES APPLIED AT DATA INGESTION TO FACILITATE DATA OPERATIONS IN A SYSTEM OF NETWORKED COLLABORATIVE DATASETS."

FIELD

Various embodiments relate generally to data science and data analysis, computer software and systems, and wired and wireless network communications to interface among repositories of disparate datasets and computing machine-based entities that seek access to the datasets, and, more specifically, to a computing and data storage platform configured to transmute associations between data arrangements of different formats or different data models to facilitate data operations, such as queries, configured to enhance, for example, an ingested dataset via transmuted associations as, for example, interrelations among a system of networked collaborative datasets.

BACKGROUND

Advances in computing hardware and software have fueled exponential growth in the generation of vast amounts of data due to increased computations and analyses in numerous areas, such as in the various scientific and engineering disciplines, as well as in the application of data science techniques to endeavors of good-will (e.g., areas of humanitarian, environmental, medical, social, etc.). Also, advances in conventional data storage technologies provide the ability to store the increasing amounts of generated data. Consequently, traditional data storage and computing technologies have given rise to a phenomenon in which numerous desperate datasets have reached sizes and complexities that tradition data-accessing and analytic techniques are generally not well-suited for assessing conventional datasets.

Conventional technologies for implementing datasets typically rely on different computing platforms and systems, different database technologies, and different data formats, such as CSV, TSV, HTML, JSON, XML, etc. Further, known data-distributing technologies are not well-suited to enable interoperability among datasets. Thus, many typical datasets are warehoused in conventional data stores, which are known as "data silos." These data silos have inherent barriers that insulate and isolate datasets. Further, conventional data systems and dataset accessing techniques are generally incompatible or inadequate to facilitate data interoperability among the data silos.

Conventional approaches to generate and manage datasets, while functional, suffer a number of other drawbacks. For example, conventional data implementation typically may require manual importation of data from data files having "free-form" data formats. Without manual intervention, such data may be imported into data files with inconsistent or non-standard data structures or relationships. Thus, data practitioners generally are required to intervene to manually standardize the data arrangements. Further, manual intervention by data practitioners is typically required to decide how to group data based on types, attributes, etc. Manual interventions for the above, as well as other known conventional techniques, generally cause sufficient friction to dissuade the use of such data files. Thus, valuable data and its potential to improve the public well-being may be thwarted.

Moreover, traditional dataset generation and management are not well-suited to reducing efforts by data scientists and data practitioners to interact with data, such as via user interface ("UI") metaphors, over complex relationships that link groups of data in a manner that serves their desired objectives, as well as the application of those groups of data to third party (e.g., external) applications or endpoints processes, such as statistical applications.

Other drawbacks in conventional approaches to traditional data storage and computing technologies include implementations of indexes to join or combine data in different tables using relational database techniques. During data operations, such as relational-based queries applied to tables, an index value representing a value needs to be computed and compared against the other values to search for queried data in one or more tables. Examples of joining two tables related by a column include use indexed associations between primary and foreign key. Computations to employ an index association increases as the number of index associations increases, thereby impeding optimal performance of computing resources, especially in instances in which index associations and corresponding computational comparisons are performed during one or more queries, such as each query.

Thus, what is needed is a solution for facilitating techniques to optimize data operations applied to datasets, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
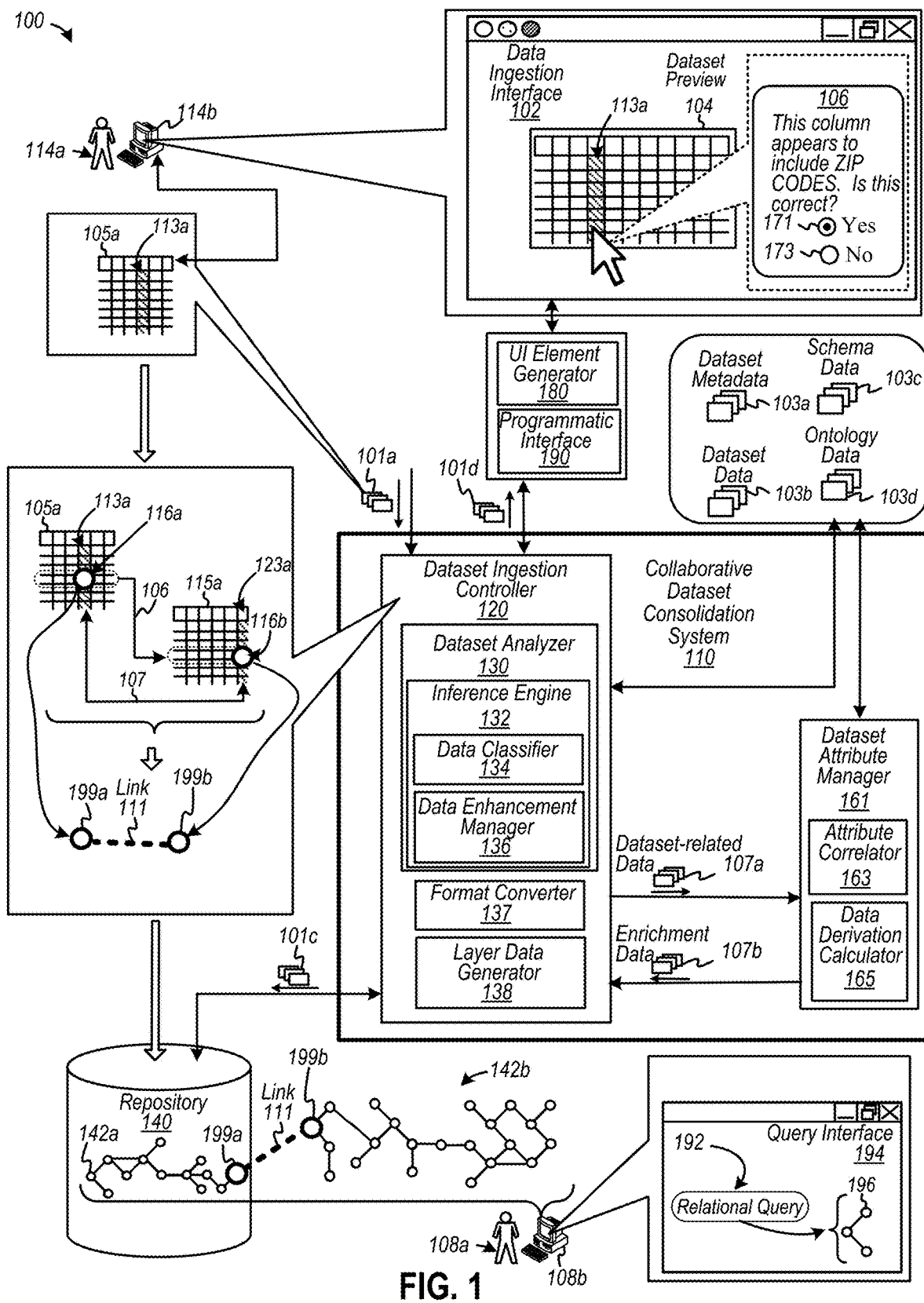
FIG. 1 is a diagram depicting an example of a dataset ingestion controller configured to transmute relationships among data in datasets to enhance querying and retrieving results thereof, according to some embodiments.

FIG. 1 is a diagram depicting an example of a dataset ingestion controller configured to transmute relationships among data in datasets to enhance querying and retrieving results thereof, according to some embodiments. Diagram 100 depicts an example of a collaborative dataset consolidation system 110 that may be configured to consolidate one or more datasets to form collaborative datasets including data to enrich datasets by accessing via, for example, transmuted associations to access a community of user datasets external to a dataset 105a, which may be associated with a user account implemented via computing device 114b for a user 114a.

Collaborative dataset consolidation system 110 may be configured to consolidate one or more datasets to form collaborative datasets. A collaborative dataset, according to some non-limiting examples, is a set of data that may be configured to facilitate data interoperability over disparate computing system platforms, architectures, and data storage devices. Further, a collaborative dataset may also be associated with data configured to establish one or more associations (e.g., metadata) among subsets of dataset attribute data for datasets and multiple layers of layered data, whereby attribute data may be used to determine correlations (e.g., data patterns, trends, etc.) among the collaborative datasets.

Further, collaborative dataset consolidation system 110 may be configured to convert a dataset in a first format (e.g., a tabular data structure or an unstructured data arrangement) into a second format (e.g., a graph), and is further configured to interrelate data between a table and a graph, whereby at least one association between multiple tables may be transmuted to form a transmuted association between multiple graphs. Data 101a may be received in the following examples of data formats: CSV, XML, JSON, XLS, MySQL, binary, free-form, unstructured data formats (e.g., data extract from a PDF file using optical character recognition), etc., among others. Therefore, data operations, such as queries, that are designed for either a tabular or graph data structure may be implemented to access data in both formats or data arrangements. For example, a query applied to a collaborative dataset may be accomplished using either a query designed to access a tabular or relational data arrangement (e.g., a SQL query or variant thereof) or another query designed to access a graph data arrangement (e.g., a SPARQL operation or a variant thereof), which may include data for a collaborative dataset. Further, a query designed to access a tabular data arrangement may be applied differently to, or computed differently, to access a graph data arrangement, at least in one example. Therefore, a collaborative dataset of equivalent data may be configured to be accessible by different queries and programming languages, according to some examples.

Collaborative dataset consolidation system 110 is shown in this example to include a dataset ingestion controller 120 and a dataset attribute manager 161, either of which, or both, may be configured to identify and/or form transmuted associations between dataset 105a and one or more other datasets 115a associated with, for example, another format (e.g., a graph data arrangement), which may be stored in repository 140. Collaborative dataset consolidation system 110 may present a correlation via, for example, computing device 114b to provide dataset-related information to user 114a. Computing device 114a may be configured to interoperate with collaborative dataset consolidation system 110 to perform any number of data operations, including queries over interrelated or linked datasets. Thus, a community of users 114a and 108a, as well as any other participating user, may discover, share, manipulate, and query dataset-related information of interest in association with collaborative datasets. Collaborative datasets, with or without associated dataset attribute data, may be used to facilitate easier collaborative dataset interoperability (e.g., consolidation) among sources of data that may be differently formatted at origination.

To illustrate formation of a transmuted association, consider an example in which dataset ingestion controller 120 receives data 101a representing a dataset 105a, whereby dataset 105a, while being depicted as a being formatted a table in data 101a, may be disposed in any data format, arrangement, structure, etc., or may be unstructured. Dataset ingestion controller 120 may arrange data in dataset 105a into a first data arrangement, or may identify that data in dataset 105a as being disposed in a data arrangement, such as a first data arrangement. In this example, dataset 105a may be disposed in a tabular data arrangement that format converter 137 may convert into a second data arrangement, such as a graph data arrangement 142a. As such, data in a field (e.g., a unit of data in a cell at a row and column) of a table may be disposed in association with a node in a graph (e.g., as a unit of data as linked data). A data operation (e.g., a query) may be applied as either a query against a tabular data arrangement (e.g., based on a relational data model) or graph data arrangement (e.g., based on a graph data model, such using RDF). Since equivalent data disposed in both a field of a table and a node of a graph, either the table or the graph may be used to perform queries and other data operations. Similarly, data datasets disposed in one or more other graph data arrangements 142b may be disposed or otherwise mapped (e.g., linked) as a dataset into a tabular data arrangement 115a.

Data analyzer 130 may be configured to identify a referential indicator 113a for at least a subset of dataset 105a and another referential indicator 123a for at least another subset of dataset 115a. Dataset 115a may be different than dataset 105a (e.g., at least a portion of dataset 115a may be stored or generated external to collaborative dataset consolidation system 110 or repository 140). In some examples, data analyzer 130 may be configured to identify a value 116a and another value 116b that may be equivalent, and an association may be formed between values 116a and 116b. In at least one case, one of values 116a and 116b is a unique value. As shown, value 116a in a row of dataset 105a, as a referential indicator, may be used to reference via 106 to value 116b, which, in turn, also may be used as a referential indicator back to value 116a. Note, too, that value 116a in a row of dataset 105a may be used to employ an identifier of the row as reference 106 (or any portion of dataset 105a) to another row that includes value 116b (or any portion of dataset 115a). In some examples, a subset of dataset 105a may include one or more columns that include one or more referential indicators 113a, whereas a subset of dataset 115a may include one or more columns that include one or more referential indicators 123a.

According to some examples, dataset analyzer 130 and any of its components, including inference engine 132, may be configured to analyze values 116a and 116b to detect or determine equivalency (e.g., during ingestion) and whether one of values 116a and value 116b may be used as a reference indicator to the other. For example, inference engine 132 may be configured to analyze data to determine or infer that values 116a and 116b are equivalent (e.g., as equivalent numbers, equivalent strings, equivalent classifications, such as data values being zip codes, equivalent data types, etc., or any other equivalent dataset attribute). In the example shown, inference engine 132 (and/or data classifier 124) may determine or infer that data values in column 113a may include data classified as "zip codes," whereby data 101d may be transmitted to a user interface, such as data ingestion interface 102, to confirm whether column data 113a includes zip codes of a dataset preview 104 for dataset 105a. Selection device 179 may be used to receive an input via interface 106 as to whether column 113a includes zip codes (e.g., via selection of user input 171) or not (e.g., via selection of user input 173). A user may confirm formation of association 107 via data 101d. In alternative implementations, a determination of zip codes associations may be predicted or probabilistically determined by performing various computations, by matching data patterns, etc. For example, equivalency of values may be determined or predicted based on statistical computations, including Bayesian techniques, deep-learning techniques, etc. In view of the foregoing, data ingestion interface 102 may facilitate data equivalency determinations and dataset enrichment for dataset 105a "in-situ" or "in-line" (e.g., in real time or near real time) to enhance expansion of data in atomized dataset generation during the dataset ingestion and/or graph formation processes with, for example, formation of a transmuted association.

Further, data analyzer 130 may be configured to determine or form an association 107 between referential indicator 123a and referential indicator 123b, and, thus, between value 116a and another value 116b. In some examples, one of one or more associations 107 between a unique value 116a may be determined or formed with one or more equivalent values 116b (or conversely). According to some examples, association 107 may include an indexed-based association, whereby one of values 116a and 116b may be stored for a tabular data arrangement as an index that may be used to relate (e.g., join) data from one or more tables using relational database techniques. During data operations, such as queries, performed on tabular data arrangements of datasets 105a and 115a, may implement an index value representing one of values 116a and 116b for comparing against (e.g., as an equality-determination) the other value to search for queried data. According to some examples, referential indicator 113a (and/or the data values therein, such as value 116a) may be referred to, or implemented as, a primary key, whereas referential indicator 123a (and/or the data values therein, such as value 116b) may be referred to, or implemented as, a foreign key. Or, conversely, referential indicator 123a may be a primary key and referential indicator 113a may be a foreign key.

Data ingestion controller 120 and/or any of its constituent components may be configured to transmute association 107 to form a transmuted association as a link 111 between value 116a (as one of referential indicator 113a) and value 116b (as one of referential indicator 123a). As shown, transmuted association 107 may form link 111 between, for example, node 199a and node 199b, which include data representing value 116a and value 116b, respectively. Transmuted association 107, as link 111, then may facilitate integration of dataset 115a with dataset 105a, thereby forming a merged dataset as an enriched dataset. When queried or modified subsequently, data enhancement manager 136 may be configured to manage the enrichment (i.e., supplementation of dataset 105a). According to some examples, a transmuted association 207 may refer to, at least in some cases, a transmutation of an association between or among primary key data and a foreign key data, in a tabular data model, that may be applied or implemented within a graph data model.

In view of the foregoing, the structures and/or functionalities depicted in FIG. 1 illustrate dataset ingestion controller 120 being configured to analyze, detect, and form transmuted associations between dataset 105a and one or more other datasets 115a, and the data therein, during ingestion of a set of data 105a to facilitate expeditious data operations, such as queries, that include the transmuted associations. According to some examples, a query may be applied via linked data (e.g., including link 111) of graph data arrangements 142a and 142b, thereby foregoing computing equality operations to detect whether referential indicator 113a (e.g., value 116a) matches referential indicator 123a (e.g., value 116b). In some examples, an equivalency determination may be performed during ingestion of dataset 105a, with a transmuted association obviating such determinations in relation to, for example, queries or other data operations. Therefore, queries using one or more links 111 based on transmuted associations may enhance computational performance by, among other things, foregoing computations or calculations relating to the use of indices.

Further, since the structures and/or functionalities of collaborative dataset consolidation system 110 enable a query written against either against a tabular data arrangement or graph data arrangement to extract data from a common set of data, a user (e.g., data scientist) that favors usage of either SQL-equivalent query languages or SPARQL-equivalent query languages, or any other equivalent programming languages, may implement any of the foregoing languages. As such, a data practitioner may more easily query a common data set of data using a familiar query language. To illustrate, consider a query may be directed to a tabular data arrangement to join dataset 105a to a different dataset 115a to extract data from both datasets, whereby transmuted association 107 may be used to retrieve results of the query. As shown, a user 108a may apply a relational query 192 on interface 194 of computing device 108b to query a graph data arrangement 196.

In one example, a command conforming to relational database operations may be used to query link 111 in a graph database. An example of such a command may include a statement having a syntax associated with relational data operations for accessing a relational data structure. Thus, a SQL-like language or command may be used to access via a transmuted association a graph database to obtain performance enhancements by foregoing indexed-based associations, especially as the number of different links 111 may be integrated with an increasing number of dataset integrations.

Further to diagram 100, format converter 137 may be configured to convert dataset 105a into another format, such as a graph data arrangement 142a, which may be transmitted as data 101c for storage in data repository 140. Graph data arrangement 142a in diagram 100 may be linkable (e.g., via links 111) to other graph data arrangements to form a collaborative dataset. Also, format converter 137 may be configured to generate ancillary data or descriptor data (e.g., metadata) that describe attributes associated with each unit of data in dataset 105a. The ancillary or descriptor data can include data elements describing attributes of a unit of data, such as, for example, a label or annotation (e.g., header name) for a column, an index or column number, a data type associated with the data in a column, etc. In some examples, a unit of data may refer to data disposed at a particular row and column of a tabular arrangement (e.g., originating from a cell in dataset 105a). In some cases, ancillary or descriptor data may be used by data classifier 134 determine whether data may be classified into a certain classification, such as where a column of data includes "zip codes."

Layer data generator 136 may be configured to form linkage relationships of ancillary data or descriptor data to data in the form of "layers" or "layer data files." Implementations of layer data files may facilitate the use of supplemental data (e.g., derived or added data, etc.) that can be linked to an original source dataset, whereby original or subsequent data may be preserved. As such, format converter 137 may be configured to form referential data (e.g., IRI data, etc.) to associate a datum (e.g., a unit of data) in a graph data arrangement to a portion of data in a tabular data arrangement. Thus, data operations, such as a query, may be applied against a datum of the tabular data arrangement as the datum in the graph data arrangement. An example of a layer data generator 136, as well as other components of collaborative dataset consolidation system 110, may be described in U.S. patent application Ser. No. 15/927,004 filed on Mar. 20, 2018, and titled "LAYERED DATA GENERATION AND DATA REMEDIATION TO FACILITATE FORMATION OF INTERRELATED DATA IN A SYSTEM OF NETWORKED COLLABORATIVE DATASETS," which is herein incorporated by reference.

According to some embodiments, a collaborative data format may be configured to, but need not be required to, format converted dataset 105a as an atomized dataset. An atomized dataset may include a data arrangement in which data is stored as an atomized data point that, for example, may be an irreducible or simplest data representation (e.g., a triple is a smallest irreducible representation for a binary relationship between two data units) that are linkable to other atomized data points, according to some embodiments. As atomized data points may be linked to each other, data arrangement 142a may be represented as a graph, whereby converted dataset 105a (i.e., atomized dataset 105a) may form a portion of a graph. In some cases, an atomized dataset facilitates merging of data irrespective of whether, for example, schemas or applications differ. Further, an atomized data point may represent a triple or any portion thereof (e.g., any data unit representing one of a subject, a predicate, or an object), according to at least some examples.

As further shown, collaborative dataset consolidation system 110 may include a dataset attribute manager 161, which includes an attribute correlator 163 and a data derivation calculator 165. Dataset ingestion controller 120 and dataset attribute manager 161 may be communicatively coupled to dataset ingestion controller 120 to exchange dataset-related data 107a and enrichment data 107b, both of which may exchange data from a number of sources (e.g., external data sources) that may include dataset metadata 103a (e.g., descriptor data or information specifying dataset attributes), dataset data 103b (e.g., some or all data stored in system repositories 140, which may store graph data), schema data 103c (e.g., sources, such as schema.org, that may provide various types and vocabularies), ontology data 103d from any suitable ontology and any other suitable types of data sources. One or more elements depicted in diagram 100 of FIG. 1 may include structures and/or functions as similarly-named or similarly-numbered elements depicted in other drawings, or as otherwise described herein, in accordance with one or more examples.

In this example, dataset ingestion controller 120 is shown to communicatively coupled to a user interface, such as data ingestion interface 102 via one or both of a user interface ("UI") element generator 180 and a programmatic interface 190 to exchange data and/or commands (e.g., executable instructions) for facilitating data enrichment of dataset 105a. UI element generator 180 may be configured to generate data representing UI elements to facilitate the generation of data ingestion interface 102 and graphical elements thereon. For example, UI generator 180 may cause generation UI elements, such as a container window (e.g., icon to invoke storage, such as a file), a browser window, a child window (e.g., a pop-up window), a menu bar (e.g., a pull-down menu), a context menu (e.g., responsive to hovering a cursor over a UI location), graphical control elements (e.g., user input buttons, check boxes, radio buttons, sliders, etc.), and other control-related user input or output UI elements. Programmatic interface 190 may include logic configured to interface collaborative dataset consolidation system 110 and any computing device configured to present data ingestion interface 102 via, for example, any network, such as the Internet. In one example, programmatic interface 190 may be implemented to include an applications programming interface ("API") (e.g., a REST API, etc.) configured to use, for example, HTTP protocols (or any other protocols) to facilitate electronic communication. According to some examples, user interface ("UI") element generator 180 and a programmatic interface 190 may be implemented in collaborative dataset consolidation system 110, in a computing device associated with data ingestion interface 102, or a combination thereof. UI element generator 180 and/or programmatic interface 190 may be referred to as computerized tools, or may facilitate employing a user interface as a computerized tool, according to some examples.

In at least one example, additional datasets to enhance dataset 142a may be determined through collaborative activity, such as identifying that a particular dataset may be relevant to dataset 142a based on electronic social interactions among datasets and users. For example, data representations of other relevant dataset to which links may be formed may be made available via a dataset activity feed. A dataset activity feed may include data representing a number of queries associated with a dataset, a number of dataset versions, identities of users (or associated user identifiers) who have analyzed a dataset, a number of user comments related to a dataset, the types of comments, etc.). Thus, dataset 142a may be enhanced via "a network for datasets" (e.g., a "social" network of datasets and dataset interactions). While "a network for datasets" need not be based on electronic social interactions among users, various examples provide for inclusion of users and user interactions (e.g., social network of data practitioners, etc.) to supplement the "network of datasets." According to various embodiments, one or more structural and/or functional elements described in FIG. 1, as well as below, may be implemented in hardware or software, or both. Examples of one or more structural and/or functional elements described herein may be implemented as set forth in one or more of U.S. patent application Ser. No. 15/186,514, filed on Jun. 19, 2016, and titled "COLLABORATIVE DATASET CONSOLIDATION VIA DISTRIBUTED COMPUTER NETWORKS," U.S. patent application Ser. No. 15/186,517, filed on Jun. 19, 2016, and titled "QUERY GENERATION FOR COLLABORATIVE DATASETS," and U.S. patent application Ser. No. 15/454,923, filed on Mar. 9, 2017, and titled "COMPUTERIZED TOOLS TO DISCOVER, FORM, AND ANALYZE DATASET INTERRELATIONS AMONG A SYSTEM OF NETWORKED COLLABORATIVE DATASETS," each of which is herein incorporated by reference.

Figure 2:
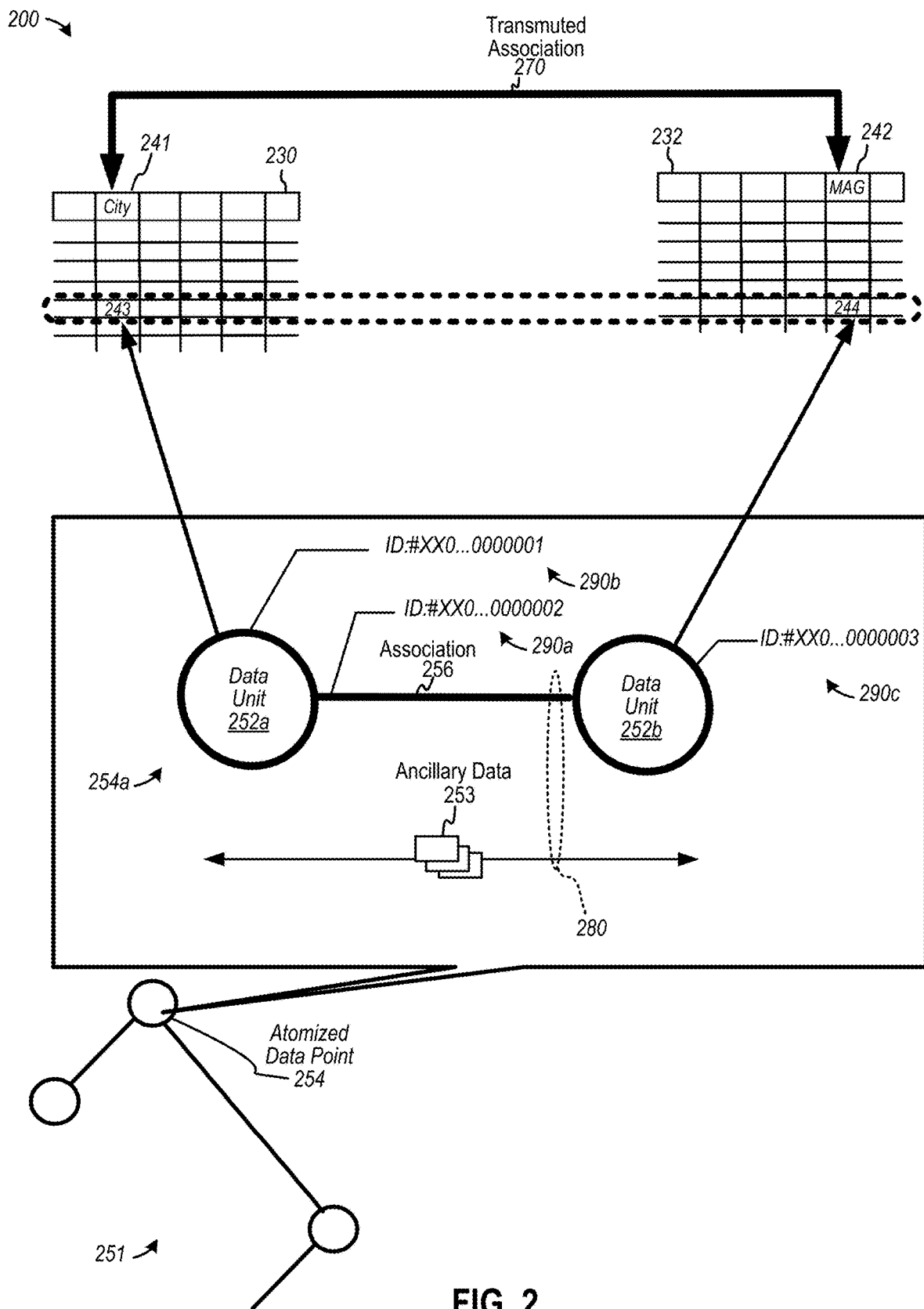
FIG. 2 is a diagram depicting an example of an atomized data point, according to some embodiments.

FIG. 2 is a diagram depicting an example of an atomized data point, according to some embodiments. Diagram 250 depicts a portion 251 of an atomized dataset that includes an atomized data point 254. In this example, atomized data point 254 and/or its constituent components may facilitate implementation of a transmuted association within a graph data arrangement based on a graph data model. As shown, transmuted associated 270 may be implemented to form a link between a unit of data 243, which may represent a city name, and a unit of data 244, which may represent a magnitude ("MAG") of a tornado. Unit of data 243 may be associated with a column of data 241, which may serve as a primary key in a tabular data structure 230, whereas unit of data 244 may be associated with a column of data 242, which may serve as a foreign key in a tabular data structure 232.

In some examples, an atomized dataset may be formed by converting a tabular data format into a format associated with the atomized dataset. In some cases, portion 251 of the atomized dataset can describe a portion of a graph that includes one or more subsets of linked data. Further to diagram 250, one example of atomized data point 254 is shown as a data representation 254a, which may be represented by data representing two data units 252a and 252b (e.g., objects) that may be associated via data representing an association 256 with each other. One or more elements of data representation 254a may be configured to be individually and uniquely identifiable (e.g., addressable), either locally or globally in a namespace of any size. For example, elements of data representation 254a may be identified by identifier data 290a, 290b, and 290c (e.g., URIs, URLs, IRIs, etc.).

In some embodiments, atomized data point 254a may be associated with ancillary data 153 to implement one or more ancillary data functions. For example, consider that association 256 spans over a boundary between an internal dataset, which may include data unit 252a, and an external dataset (e.g., external to a collaboration dataset consolidation), which may include data unit 252b. Ancillary data 253 may interrelate via relationship 280 with one or more elements of atomized data point 254a such that when data operations regarding atomized data point 254a are implemented, ancillary data 253 may be contemporaneously (or substantially contemporaneously) accessed to influence or control a data operation. In one example, a data operation may be a query and ancillary data 253 may include data representing authorization (e.g., credential data) to access atomized data point 254a at a query-level data operation (e.g., at a query proxy during a query). Thus, atomized data point 254a can be accessed if credential data related to ancillary data 253 is valid (otherwise, a request to access atomized data point 254a (e.g., for forming linked datasets, performing analysis, a query, or the like) without authorization data may be rejected or invalidated). According to some embodiments, credential data (e.g., passcode data), which may or may not be encrypted, may be integrated into or otherwise embedded in one or more of identifier data 290a, 290b, and 290c. Ancillary data 253 may be disposed in other data portion of atomized data point 254a, or may be linked (e.g., via a pointer) to a data vault that may contain data representing access permissions or credentials.

Atomized data point 254a may be implemented in accordance with (or be compatible with) a Resource Description Framework ("RDF") data model and specification, according to some embodiments. An example of an RDF data model and specification is maintained by the World Wide Web Consortium ("W3C"), which is an international standards community of Member organizations. In some examples, atomized data point 254a may be expressed in accordance with Turtle (e.g., Terse RDF Triple Language), RDF/XML, N-Triples, N3, or other like RDF-related formats. As such, data unit 252a, association 256, and data unit 252b may be referred to as a "subject," "predicate," and "object," respectively, in a "triple" data point (e.g., as linked data). In some examples, one or more of identifier data 290a, 290b, and 290c may be implemented as, for example, a Uniform Resource Identifier ("URI"), the specification of which is maintained by the Internet Engineering Task Force ("IETF"). According to some examples, credential information (e.g., ancillary data 253) may be embedded in a link or a URI (or in a URL) or an Internationalized Resource Identifier ("IRI") for purposes of authorizing data access and other data processes. Therefore, an atomized data point 254 may be equivalent to a triple data point of the Resource Description Framework ("RDF") data model and specification, according to some examples. Note that the term "atomized" may be used to describe a data point or a dataset composed of data points represented by a relatively small unit of data. As such, an "atomized" data point is not intended to be limited to a "triple" or to be compliant with RDF; further, an "atomized" dataset is not intended to be limited to RDF-based datasets or their variants. Also, an "atomized" data store is not intended to be limited to a "triplestore," but these terms are intended to be broader to encompass other equivalent data representations.

Examples of triplestores suitable to store "triples" and atomized datasets (and portions thereof) include, but are not limited to, any triplestore type architected to function as (or similar to) a BLAZEGRAPH triplestore, which is developed by Systap, LLC of Washington, D.C., U.S.A.), any triplestore type architected to function as (or similar to) a STARDOG triplestore, which is developed by Complexible, Inc. of Washington, D.C., U.S.A.), any triplestore type architected to function as (or similar to) a FUSEKI triplestore, which may be maintained by The Apache Software Foundation of Forest Hill, Md., U.S.A.), and the like.

Figure 3:
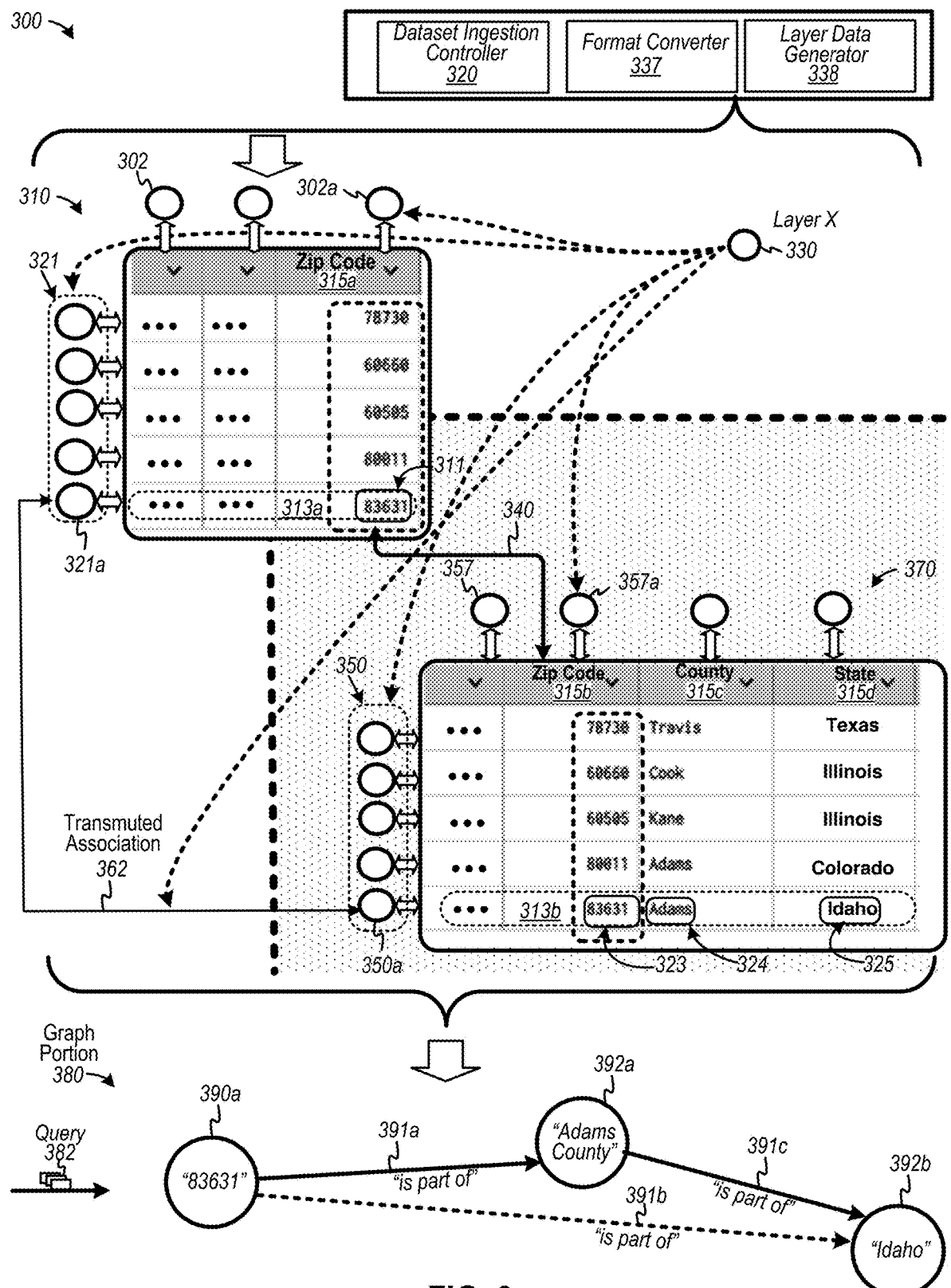
FIG. 3 is a diagram depicting an example of formatting a dataset to form a transmuted association, according to some examples.

FIG. 3 is a diagram depicting an example of formatting a dataset to form a transmuted association, according to some examples. Diagram 300 depicts a dataset 310 including subsets of data, including a column of data values representing "zip codes," disposed in a tabular data arrangement. Format converter 337 may be configured to convert dataset 310 into another format, such as a graph data arrangement. In this case, rows, including row 313a, of dataset 310 may be associated or otherwise linked to row nodes 321 of a graph (not shown). In some implementations, nodes 321 may also reference data representing entities, records, and the like. Also shown, columns, such as column 315a, of dataset 310 may be associated with column nodes 302 of a graph (not shown). Other nodes, links, references, etc. of a graph may be implemented (not shown). As shown, a unit of data 311 includes a string or an integer representing a zip code "83631."

Dataset ingestion controller 320 may be configured to analyze data of dataset 310 against data in a pool of one or more dataset, any of which may be linked to another dataset. An example of one or more datasets is depicted as dataset 370, which may be disposed in a graphical data arrangement. Dataset 370 may be associated with a graph including row nodes 350 and columns nodes 357, as well as other nodes, links, references, etc. (not shown). Here, links from a graph (e.g., via nodes 350 and 357) to units of data may be usable to present dataset 370 in a tabular data arrangement including rows, such as row 313b, and columns, such as columns 315b, 315c, and 315d.

Dataset ingestion controller 320 may be configured to match data in dataset 310 against data in a pool of data including dataset(s) 370. In the example shown, a value of a unit of data 311 (of dataset 310) may match a value of a unit of data 323 (of dataset 370). Dataset ingestion controller 320 also may be configured to detect data in column 315a as including an equivalent data classification as column 315b. In particular, columns 315a and 315b include "zip code" data. Hence, data in column 315a may be identified as a first reference indicator and data in column 315b may be identified as a second reference indicator. Thus, a unit of data (e.g., data unit 311) may reference 340 to another unit of data (e.g., data unit 323).

In some examples, data in column 315a may be used to establish a primary key, and data in column 315b may be used to establish a foreign key (or conversely). Therefore, a user may be presented in a user interface an indication that columns 315a and 315b may include zip code data, whereby a user may confirm the columns include equivalent data so that associations, such as association 340, may be used to combine (e.g., join) data of datasets 310 and 370 at columns including reference indicator data. Association 340 may identify that a unit of data ("zip code 83631") 311 in row 313a is linked to another unit of data ("zip code 83631") 323 in row 313b.

According to some examples, one or more of dataset ingestion controller 320, format converter 337, and layer data generator 338 may be configured to transmute association 340 into a graph data arrangement, whereby a transmuted association 362 may be formed within a graph data arrangement. In the example shown, transmuted association 362 may link a node associated with unit of data 311 and a node associated with a unit of data 323. In the example shown, units of data 311 and 323 may be associated with a layer ("X") 330, whereby layer data generator 338 identifies links for row node 321a and column node 302a for unit of data 311, and identifies links for row node 350a and column node 357a for unit of data 323. Layer 330 may also include data representing a link to transmuted association 362.

A graph portion 380 is shown to include one or more links based on a transmuted association derived from a relationship between, for example, primary and secondary keys may be implemented as a portion of a graph. In graph portion 380, a node 390a associated with a unit of data (e.g., zip code 83631) links to a node 392a, which is associated with a county name (e.g., county name "Adams County"). Nodes 390a and 392a may be linked via link 391a, which represents that zip code 83631 "is a part of" Adams County. Further, node 392a may link to a node 392b, which is associated with a state name (e.g., state name "Idaho"). Nodes 392a and 392b may be linked via link 391c, which represents that county name Adams County "is a part of" state name Idaho. Links 391a and 391c may be form one or more portions of a transmuted association 362 in which rows 313a and 313b may be combined to associate unit of data ("83631") of row 313a to unit of data ("Adams") 324 and unit of data ("Idaho") 325, both of which reside in row 313b.

Figure 6:
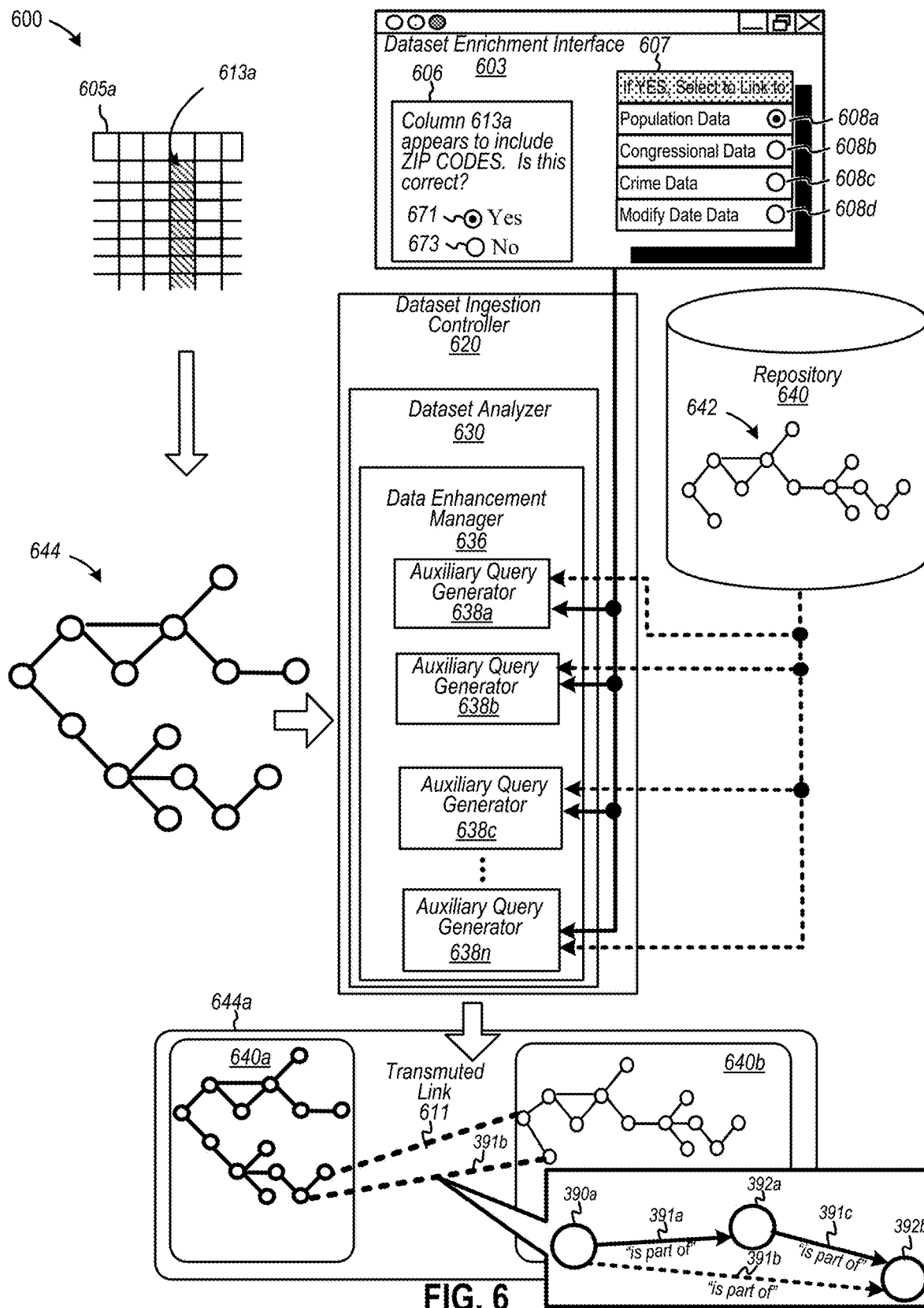
FIG. 6 is a diagram depicting examples of one or more auxiliary query generators for enriching ingested datasets, according to some examples.
Figure 7:
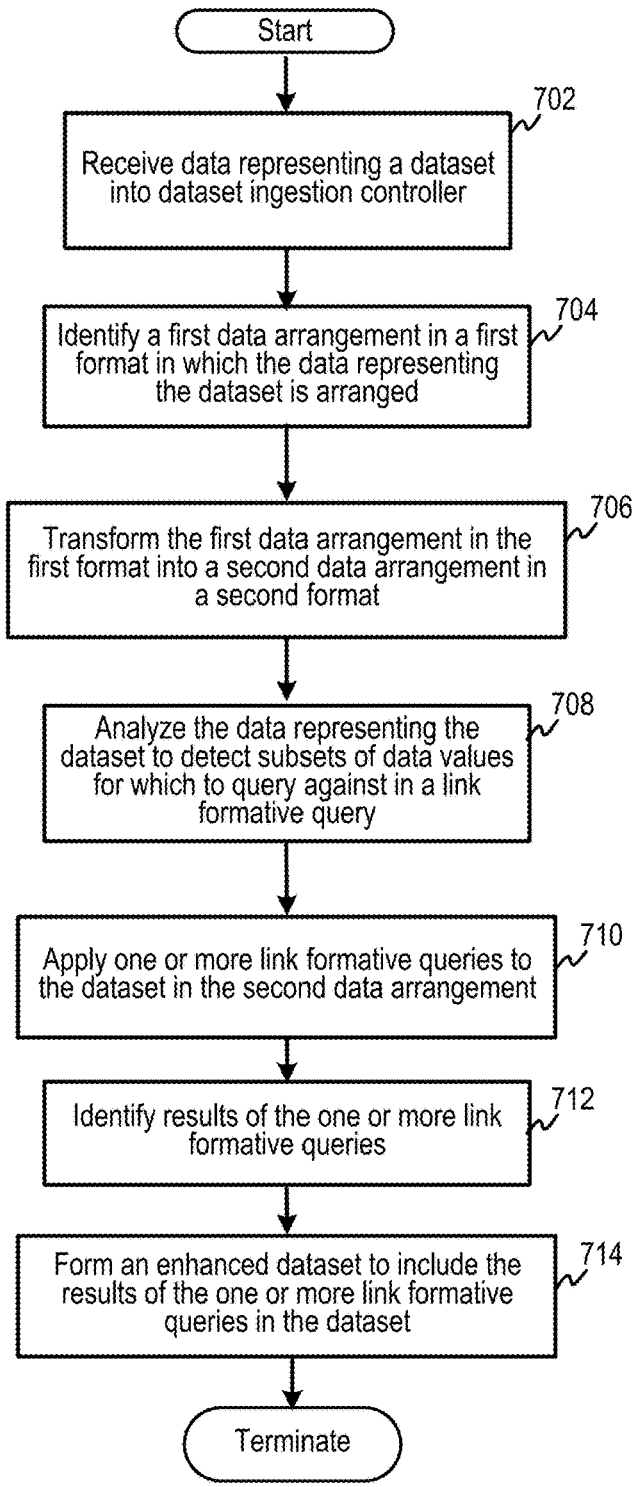
FIG. 7 is a flow diagram depicting an example of implementing link-formative queries to enhance datasets, according to some embodiments.

According to at least on example, an auxiliary query generator described in FIGS. 6 to 7 may be configured to generate an additional link in a graph data arrangement, whereby an additional link may be formed as a "created triple." Specifically, an auxiliary query may be applied to nodes 390a, 392a, and 392b and links 391a and 391c to identify an implicit relationship (i.e., zip code 83631 "is part of" the state of Idaho), thereby forming a triple including node 390a, link 391b, and node 392b, which may be referred to as an explicit relationship.

Figure 4:
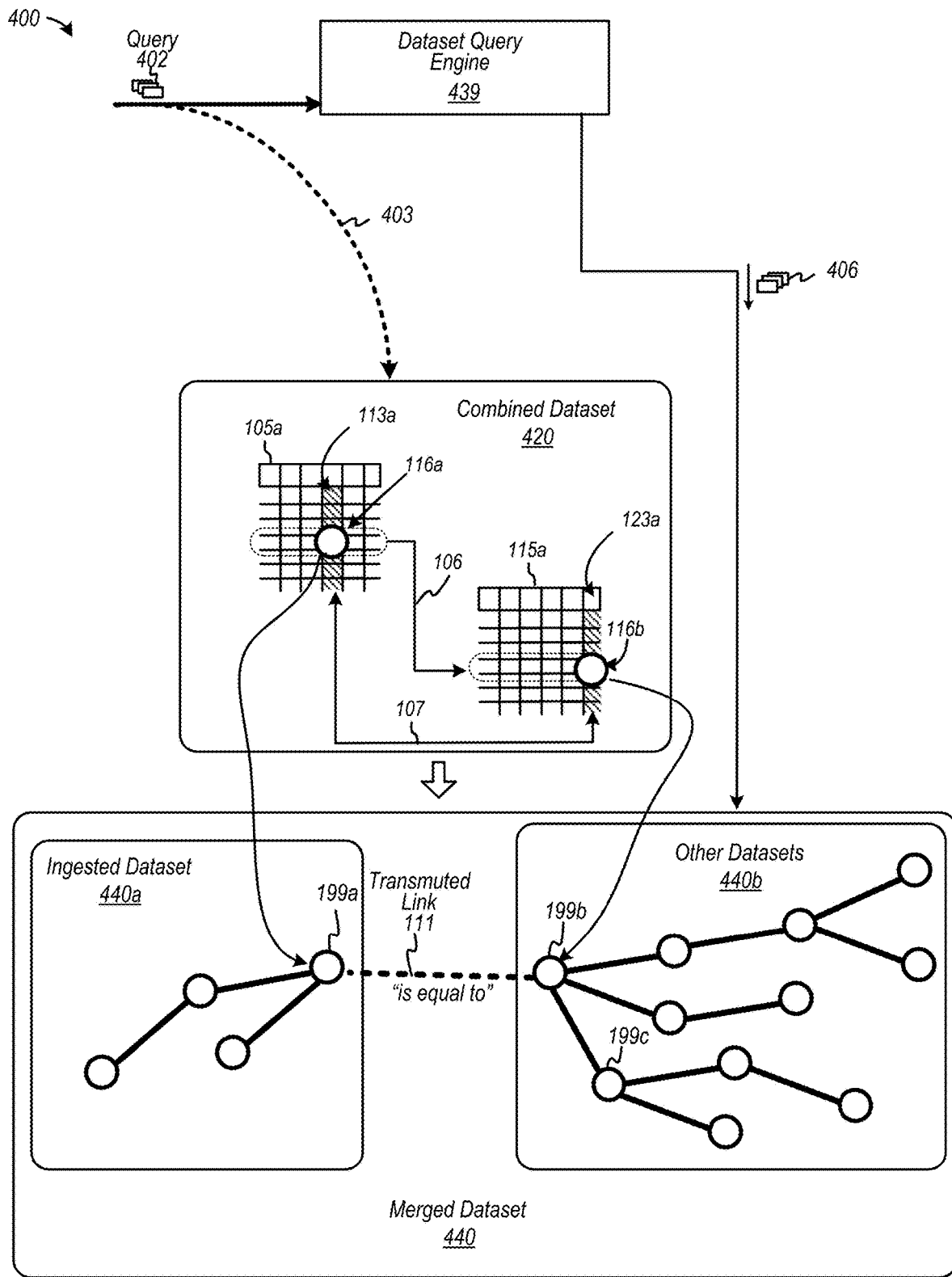
FIG. 4 is a diagram depicting a dataset query engine configured to implement a query via a transmuted association against a graph data arrangement, according to some examples.

In view of the foregoing, a relational query, or a variant thereof (e.g., an SQL-equivalent query), may be applied to data in a combination of datasets 310 and 370, which may be presented via a user interface (not shown) as a table of rows and columns. A dataset query engine, as shown in FIG. 4, may be implemented to receive the relational query and apply a query 382 to graph portion 380, thereby foregoing computing comparing data values to detect equalities of indexes used on tabular data arrangements. One or more elements depicted in diagram 300 of FIG. 3 may include structures and/or functions as similarly-named or similarly-numbered elements depicted in other drawings, or as otherwise described herein, in accordance with one or more examples.

FIG. 4 is a diagram depicting a dataset query engine configured to implement a query via a transmuted association against a graph data arrangement, according to some examples. Diagram 400 includes a dataset query engine 439, which may be disposed in a collaborative dataset consolidation system (not shown). Dataset query engine 439 may be configured to receive a query 402 to apply against a combined dataset 420, which is depicted as a combination of tabular data arrangements. In some examples, query 402 may be implemented as either a relational-based query (e.g., in an SQL-equivalent query language) or a graph-based query (e.g., in a SPARQL-equivalent query language). One or more elements depicted in diagram 400 of FIG. 4 may include structures and/or functions as similarly-named or similarly-numbered elements depicted in other drawings, or as otherwise described herein, in accordance with one or more examples.

Combined dataset 420 may be presented in a user interface as a table based on tabular data arrangements in which data in an ingested dataset 105a and another dataset 115a may be combined. Dataset 105a is shown to include a unit of data 116a associated with a subset of reference indicators (e.g., data of column 113a), whereas dataset 115a may include a unit of data 116b associated with another subset of reference indicators (e.g., data of column 123a). As shown, value 116a in a row of dataset 105a may, as a referential indicator, be used to reference via 106 to value 116b. Also shown is an association 107 between referential indicator 123a and referential indicator 123b, and, thus, between value 116a and another value 116b.

Data representing association 107 between value 116a and another value 116 may be transmuted to form a transmuted association depicted as a transmuted link 111 to combine dataset 105a disposed in a graph, such as ingested dataset 440a, with another dataset 115a disposed in another graph, such as other datasets 440b. Transmuted link 111 thus facilitates querying a merged dataset 440 as a graph data arrangement via transmuted link 111, which couples node 199a to 199b. In one example, node 199a may be associated with value 116a and node 199b may be associated with other value 116b, whereby transmuted link 111 may include data characterizing a relationship or property associating values 116a and 116b. In this example, transmuted link 111 includes data characterizing values associated with nodes 199a and 199b as being equivalent (e.g., equal or sufficiently similar to each other). According to various examples, data may vary for transmuted link 111 and nodes 199a and 199b to form any number of triples. In view of the foregoing, a query 402 configured to query a relational data model may be received into dataset query engine 439, which, in turn, transmits a query 406 for application against graph data arrangements as a merged dataset 440. Query 406 omits or otherwise need not invoke application of, or computations for, an index-based association to query linked data of a graph. A query being applied to node 199a may be extended to include node 199c.

Figure 5:
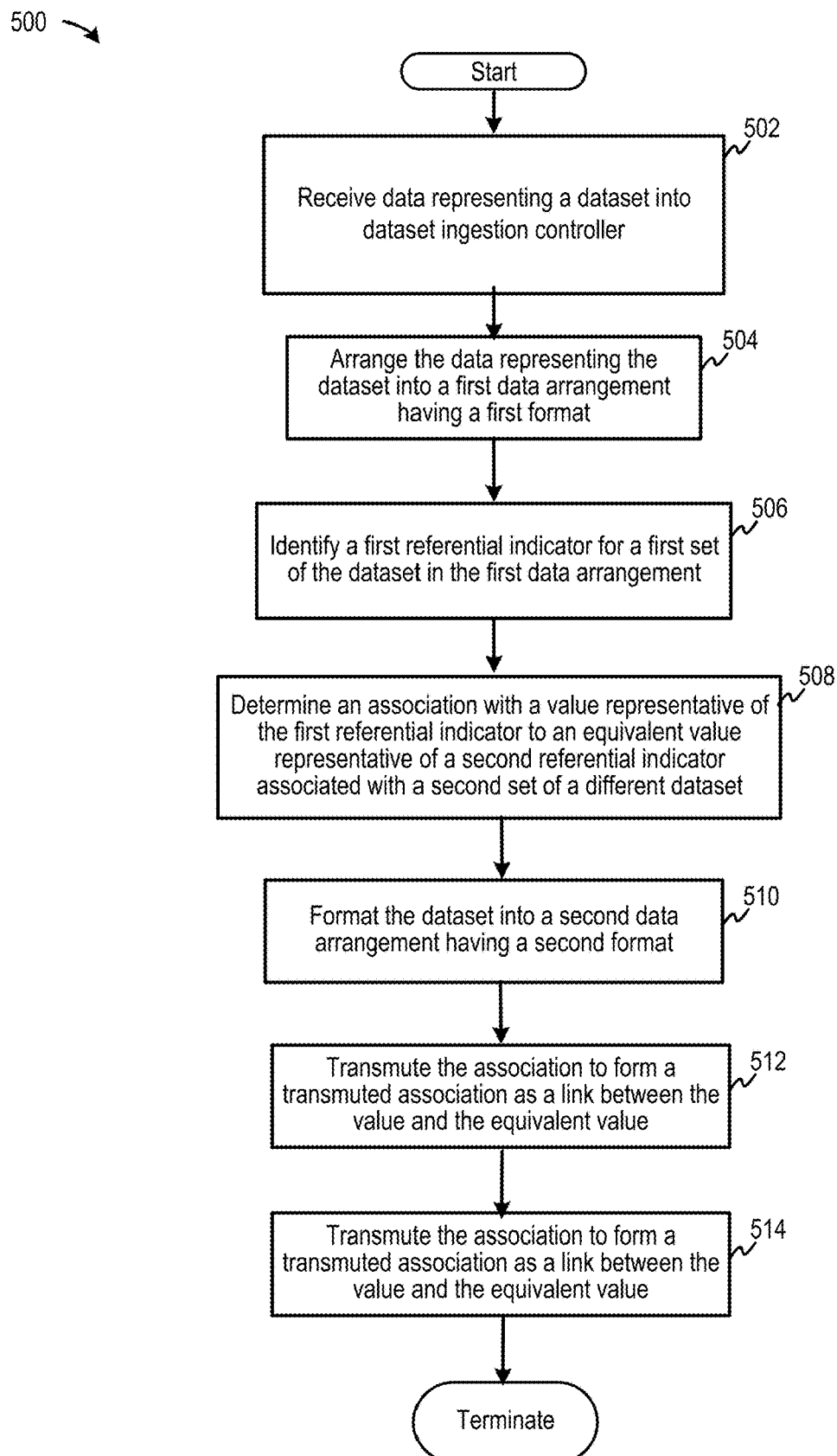
FIG. 5 is a flow diagram depicting an example of transmuting relationships among data during data ingestion to enhance querying and retrieving results thereof, according to some embodiments.

FIG. 5 is a flow diagram depicting an example of transmuting relationships among data during data ingestion to enhance querying and retrieving results thereof, according to some embodiments. At 502 of flow 550, data representing a dataset may be received into a dataset ingestion controller. At 504, data representing the dataset may be identified as being disposed in, or may be arranged within, a first data arrangement having a first format, such as a tabular format. At 506, a first referential indicator for a first set of the dataset in the first data arrangement may be identified. The first referential indicator may refer to one or more data values disposed, for example, in a column, or may refer to one or more columns of data. At 508, an association may be determined, whereby the association may exist between a value representative of the first referential indicator and an equivalent value representative of a second referential indicator associated with a second set of a different dataset. At 510, an ingested dataset may be formatted into a second data arrangement having a second format, such as a graph format. Note that 510 may be disposed anywhere in flow 500, such as subsequent to 506. At 512, an association may be transmuted to form a transmuted association, as a link between a value and an equivalent value. At 514, a transmuted association may be integrated into at least a portion of the first data arrangement. Further, transmuted association may be integrated into a combined dataset (e.g., a merged dataset), and may persist for subsequent dataset links and data enhancements.

FIG. 6 is a diagram depicting examples of one or more auxiliary query generators for enriching ingested datasets, according to some examples. Diagram 600 includes a dataset ingestion controller 620, which includes a dataset analyzer 630. Further, dataset ingestion controller 620 includes a data enhancement manager 636 including one or more auxiliary query generators, such as auxiliary query generators 638a, 638b, 638c, and 638n. Data enhancement manager 636 may be communicatively coupled to a data repository 640 storing any number of datasets in a pool of datasets, including dataset 642, within a graph data arrangement. Also, data enhancement manager 636 may be coupled to a computing device (not shown) to present a data enhancement interface 603, which may accept user input to initiate generation of auxiliary queries as "link-formative" queries. A link-formative query may be configured to generate results for integrating or merging back into an ingested dataset 605a, thereby enhancing ingested data set 605a. A link-formative query may be a query that, for example, invokes or otherwise is configured to form links, at least in some implementations. Thus, results of a link-formative query may be a graph including a created or new dataset of linked data. One or more elements depicted in diagram 600 of FIG. 6 may include structures and/or functions as similarly-named or similarly-numbered elements depicted in other drawings, or as otherwise described herein, in accordance with one or more examples.

In the example shown, data representing a dataset 605a may be received into a dataset ingestion controller (not shown). Dataset ingestion controller 620 and/or its constituent components may identify dataset 605a is, or may otherwise arranged, in a first data arrangement (e.g., a tabular data arrangement) in a first format (e.g., a table). Dataset ingestion controller 620 may transform a tabular data arrangement in which dataset 605a is disposed into dataset 644, which is a second data arrangement (e.g., a graph data arrangement) in a second format (e.g., a graph) in which data in dataset 605a is disposed. Dataset analyzer 630 may be configured to analyze data representing dataset 605a to detect subsets of data values for which to perform a query (e.g., as a link-formative query). An example of a subset of data values includes data values in, for example, a column 613a for analyzing and detecting whether to perform a link-formative query.

Figure 8A:
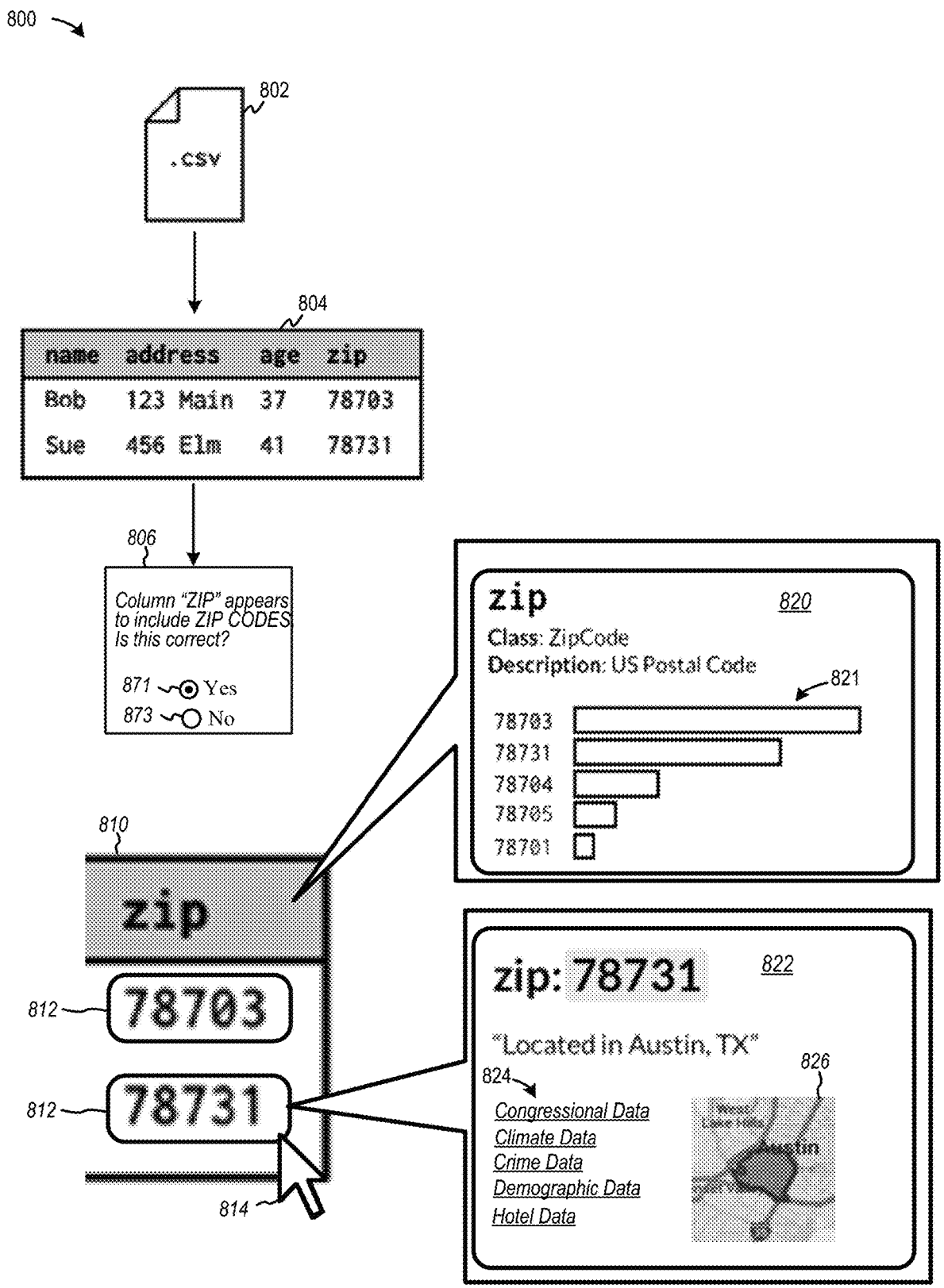
FIGS. 8A to 8D are diagrams depicting computerized tools of a user interface to cause formation of transmuted associations to facilitate link-formative queries, according to some examples.
Figure 8B:
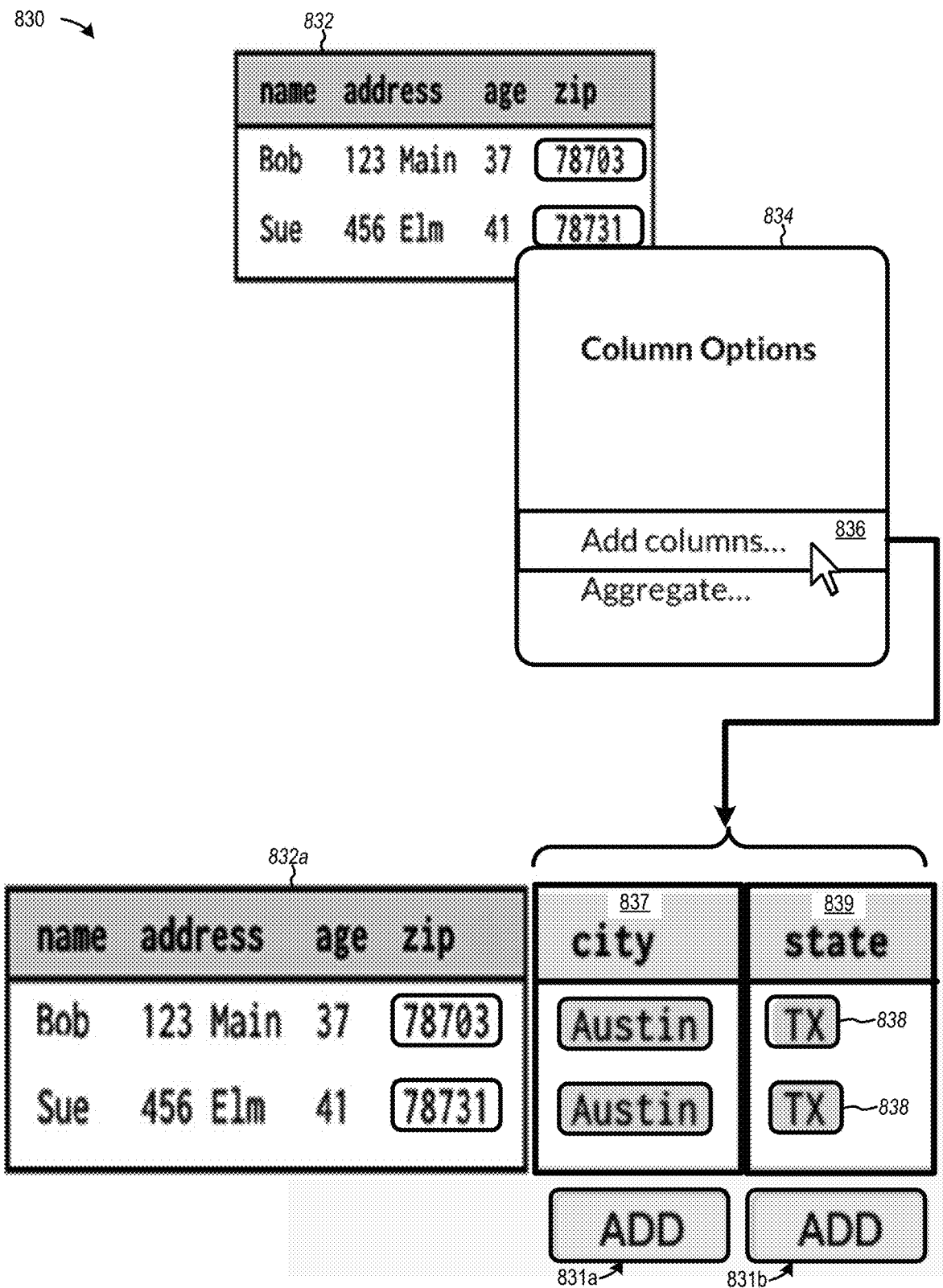

An auxiliary query generator, such as one of auxiliary query generators 638a, 638b, 638c, and 638n, may be configured to identify a subset of data, such as one or more data values in column 613a that may be compared against a pool of datasets to identify equivalent data values or dataset attributes with which to form links (e.g., as at least a portion of a link-formative query) among data in the subset of data in column 613a and the pool of datasets. A pool of datasets 642 may include any number of linked data-based graph data arrangements, at least some of which may be stored in repository 640. In some examples, an auxiliary query generator may identify equivalent data values (or dataset attributes) in dataset 605a and pool of datasets 642 upon which to perform a link-formative query. A link-formative query may be configured to perform an auxiliary or subsidiary query on ingested datasets 605*a* for identifying linkable datasets in pool of datasets 642, generating another subset of data to form a created subset of linkable data (e.g., data that can form linked data), and integrating or merging the created subset of data back into, for example, dataset 605*a* as an enrichment to dataset 644, according to some examples. In some cases, a created subset includes new data values that are absent in ingested dataset 605*a* and may be introduced into a new or added column of a tabular data arrangement for ingested dataset 605*a*. Further, data values of column 613*a*, such as "zip code data values," may be linked to a created subset of data, as linked data, which can be presented graphically as "linked data" in a user interface, examples of which are depicted in FIGS. 8A and 8B.

A link-formative query may be initiated, for example, by an auxiliary query generator, to search for specific subsets of data in pool of data 642 that may be associated with specific subsets of data in columns of 605*a*. A search may be based on a specific subset or column of data includes data classified to include similar data types, data classifications (e.g., zip code data), etc. According to some examples, each of auxiliary query generators 638*a*, 638*b*, 638*c*, and 638*n* may use specific subsets of data to search (e.g., query) a pool of datasets 642. Consider the following example in which auxiliary query generator 638*a* may be configured to identify or use "zip code data" disposed in column 613*a* to search for other data associated with zip code data in pool of datasets 642 from which to from a new, created dataset. Auxiliary query generator 638*a* may be configured to identify or use "infectious disease data" (e.g., flu outbreak data, such as data values representing different flu types, such as A, A2, B, C, H5, H5N1, etc.) disposed in column 613*a* to search for other data associated with health-related data in pool of datasets 642 from which to form another new, created dataset. Other auxiliary query generators may implement any subset of data values in columns 613*a* to perform link-formative queries "in-situ" or "in-line" (e.g., in real time or near real time) to enhance expansion of data in atomized dataset generation during the dataset ingestion and/or graph formation processes, which may be prior to subsequent data operations, such as queries. According to some examples, a link-formative query may be based on a transmuted association. Other auxiliary query generators may implement any subset of data values in columns 613*a* to perform link-formative queries "in-situ" or "in-line" (e.g., in real time or near real time) to enhance expansion of data in atomized dataset generation during the dataset ingestion and/or graph formation processes. According to some examples, a link-formative query may be based on a transmuted association.

In alternative examples, at least one of auxiliary query generators 638*a*, 638*b*, 638*c*, and 638*n* may identify or use a subset of data values disposed in column 613*a* to compute or modify the subset of data values to form a created subset of data. For example, auxiliary query generator 638*c* may be configured to initiate a query to identify whether to use "data-related" data (e.g., day, month, year, time, etc.) disposed in column 613*a* for modification to, for example, modify an annotation or form of date-related information (e.g., removing day and month to present year only dates). Thus, modified date-related data may be disposed in a new, created column that may be implemented, such as column 613*a*, within dataset 605*a*. As another example, auxiliary query generator 638*n* may be configured to identify or use numeric data values disposed in column 613*a* for use in machine learning computations. As such, auxiliary query generator 638*n* may initiate a query to identify whether to initiate a computation or modification to "normalize" the numeric data values into, for example, a range from zero ("0") to one ("1"). In some cases, a response to the query may originate from dataset enrichment interface 603. Other auxiliary query generators may implement any other computations or modifications to any subset of data values in columns 613*a* to perform link-formative queries or modifications "in-situ" or "in-line."

In some examples, operation of data enhancement manager 636 and/or its constituent components, such as auxiliary query generators 638*a*, 638*b*, 638*c*, and 638*n*, may be guided or supplemented by performance of executable instructions based on commands received responsive to inputs via dataset enrichment interface 603. In one implementation, dataset analyzer 630 may detect that column 613*a* includes "zip code" data, and, in response, dataset enrichment interface 603 may present via interface portion 606 selections with which to generate commands based on whether column 613*a* includes zip code data (e.g., via selection of input 671), or do not include zip code data (e.g., via selection of input 673). Further, dataset enrichment interface 603 may be configured to present an interface portion 607 to provide selections from which a user input data may be generated to perform one or more auxiliary queries. So, if selection 671 is activated, interface portion 607 may provide a selection 608*a* to include population data (e.g., related to zip code data), a selection 608*b* to include congressional data (e.g., related to zip code data), a selection 608*c* to include crime data (e.g., related to zip code data), and a selection 608*d* to include data directed to a modify a date format (e.g., year only date information). Each of selections 608*a*, 608*b*, 608*c*, and 608*d* may initiate a link-formative query (e.g., an auxiliary query), the results of which may be formatted for inclusion as columnar data, such as in column 613*a* of dataset 605*a*. The results of each of the link-formative queries may be integrated back into in either dataset 605*a* in a tabular data arrangement or in dataset 644 graph data arrangement, which includes data of dataset 605*a* disposed in a graph. Thus, either the link-formative queries or results therefrom, or both, may be stored in repository 640 for subsequent use.

Operation of data enhancement manager 636 and/or its constituent components, such as auxiliary query generators 638*a*, 638*b*, 638*c*, and 638*n*, may be automatic (e.g., without user input) in some examples. Further, merged datasets and results of link-formative queries may persist so that an integrated dataset, such as merge datasets 644*a*, may be modified or supplemented (e.g., via data ingestion) subsequent to initial formation. Thus, operation of auxiliary query generators 638*a*, 638*b*, 638*c*, and 638*n* may be automatically activated repeatedly until, for example, a user removes or deletes a subset of data from merged dataset 644*a*. As shown, merged dataset (e.g., an enhanced dataset) includes a graph 640*a* of ingested data associated with datasets 605*a* and a graph 640*b* of a pool of datasets. A transmuted link 611 may link graph 640*a* to graph 640*b*, whereby graphs 640*a* and 640*b* may include atomized datasets.

Moreover, results of an auxiliary query (e.g., a link-formative query) may be implemented as link 391*b*, responsive to a link-formative query that identifies "state name" data 392*b* based on a column of "zip code" data 390*a* in accordance with FIG. 3. Therefore, a link-formative query may be configured to form an explicit or direct link 391*b* based on implicit or indirect links 391*a* and 391*c* via node 392*a*, which may be associated with "county name" data. In at least one example, formation of link 391*b* (e.g., based on a link-formative query) provides for a created dataset that includes at least one additional triple.

FIG. 7 is a flow diagram depicting an example of implementing link-formative queries to enhance datasets, according to some embodiments. At 702, data representing a dataset may be received, for example, into dataset ingestion controller. At 704, a first data arrangement in a first format may be identified in which the data representing the dataset is arranged. At 706, a first data arrangement in the first format may be transformed into a second data arrangement in a second format, which may be graph-related. In some examples, a first data arrangement may be transformed into an atomized dataset that includes triples.

At 708, data representing the dataset may be analyzed to detect subsets of data values for which to query against in a link formative query. For example, an association may be determined, whereby the association may be between a value representative of a first referential indicator and an equivalent value representative of a second referential indicator, which may be associated with a different dataset. The different dataset may be a table or graph, or may be externally disposed. In some examples, one of the first referential indicator and the second referential indicator may be a primary key. The other of the first referential indicator and the second referential indicator may be a foreign key. In some examples, an association between referential indicators may be transmuted to form a transmuted association between the value and the equivalent value. In some examples, a transmuted association includes an association between referential indicators that is converted, formatted, or mapped into a graph data arrangement, according to at least one example to facilitate queries that, for example, need not implement indices to compute equivalent data. In some examples, a transmuted association facilitates link-formative queries to create datasets with, for example, explicit and direct links.

At 710, one or more link-formative queries may be applied to dataset in a second data arrangement. As such, link-formative queries may be applied to graph data arrangements, which may include a pattern of triples. At 712, results of the one or more link-formative queries may be identified. In some examples, results may be determined as a subset of resultant triples associated with a pattern of triples. A result of at least one link-formative query may be referred to as an auxiliary graph data arrangement, according to some examples. As a graph, auxiliary graph data arrangement may be integrated to form a merged graph. In at least one example, a link-formative query may apply a graph-based statement or command to identify patterns of linked data, such as triples, matching data defining a desired result, whereby the desired result "constructs" a created graph-based dataset. A graph-based statement or command may include a CONSTRUCT clause based on, for example, a graph querying language (e.g., SPARQL, or the like), the CONSTRUCT clause being configured to form created graphs matching a query pattern, which may be set forth, for example, in a WHERE clause. Other graph-based statements or commands that create graphs (e.g., new triples) may be used, and are not limited to SPARQL-based statement or commands. At 712, an enhanced dataset may be formed, whereby the enhanced dataset may include results of one or more link-formative queries in the dataset.

FIGS. 8A to 8D are diagrams depicting computerized tools of a user interface to cause formation of transmuted associations to facilitate link-formative queries, according to some examples. Diagram 800 of FIG. 8A depicts as file (e.g., .CSV) including data representing a dataset, which may be identified or arranged into a tabular data arrangement 804. According to some examples, interface portion 806 includes selections 871 and 873 to receive user input as to whether a column, such as column 810, includes a zip code data. In this case, selection 871 is selected and, in response, executable instructions are activated to link numeric zip codes "78703" and "78731" of column 810 to other data in, for example, a graph data arrangement. In at least one example, linking of zip codes "78703" and "78731" to "other datasets" may be facilitated by way of implementing a transmuted association. As shown, graphical identifiers 812 encircling each zip code number indicates that corresponding zip codes "78703" and "78731" may link to form an enriched dataset (e.g., as a merged dataset). For example, column 810 may link to data 821 representing, for example, "population density" per zip code, as depicted in a choropleth of zip codes in interface portion 820. As another example, a selection device, such as cursor 814, may cause presentation of interface portion 822, which includes enhanced data not within file 802, and made available by implementing a transmuted association (not shown) in a graph. In the example shown, zip code number 78731 and column 810 may link to enhanced datasets 824 and 826. Dataset 824 includes hypertext links to congressional data, climate data, crime data, demographic data, and hotel data, all of which are associated with zip code 78731.

FIG. 8B is a diagram 830 depicting interface processes of computerized tools to form enhanced dataset, according to some examples. While dataset 832 may be presented in diagram 830 in a tabular data arrangement, units of data therein may be linked to an underlying merged graph as graph data arrangement. To enhance dataset 832, a command may be activated to present interface portion 834, which presents options to enhance dataset 832. Selection 836, if selected, may cause presentations of user inputs in a user interface to enhance dataset 832a by adding either city data in column 837 or state data in column 839. Responsive to one or more selections 831a and 831b, dataset 832a may be integrated with data in columns 837 and/or 839, thereby forming a merged dataset, at least in the example shown. In some examples, a data arrangement 832 may be transformed into an atomized dataset including subsets of linked data points (e.g., in a graph). The data representing dataset 832 may be analyzed to detect zip code data values 78703 and 7873a, with which to query against in a link-formative query. A link-formative query applied to a pool of datasets, based on the zip code data values, may identify linkable data points in a pool of datasets that include, for example, "city name" data and "state name" data.

Figure 8C:
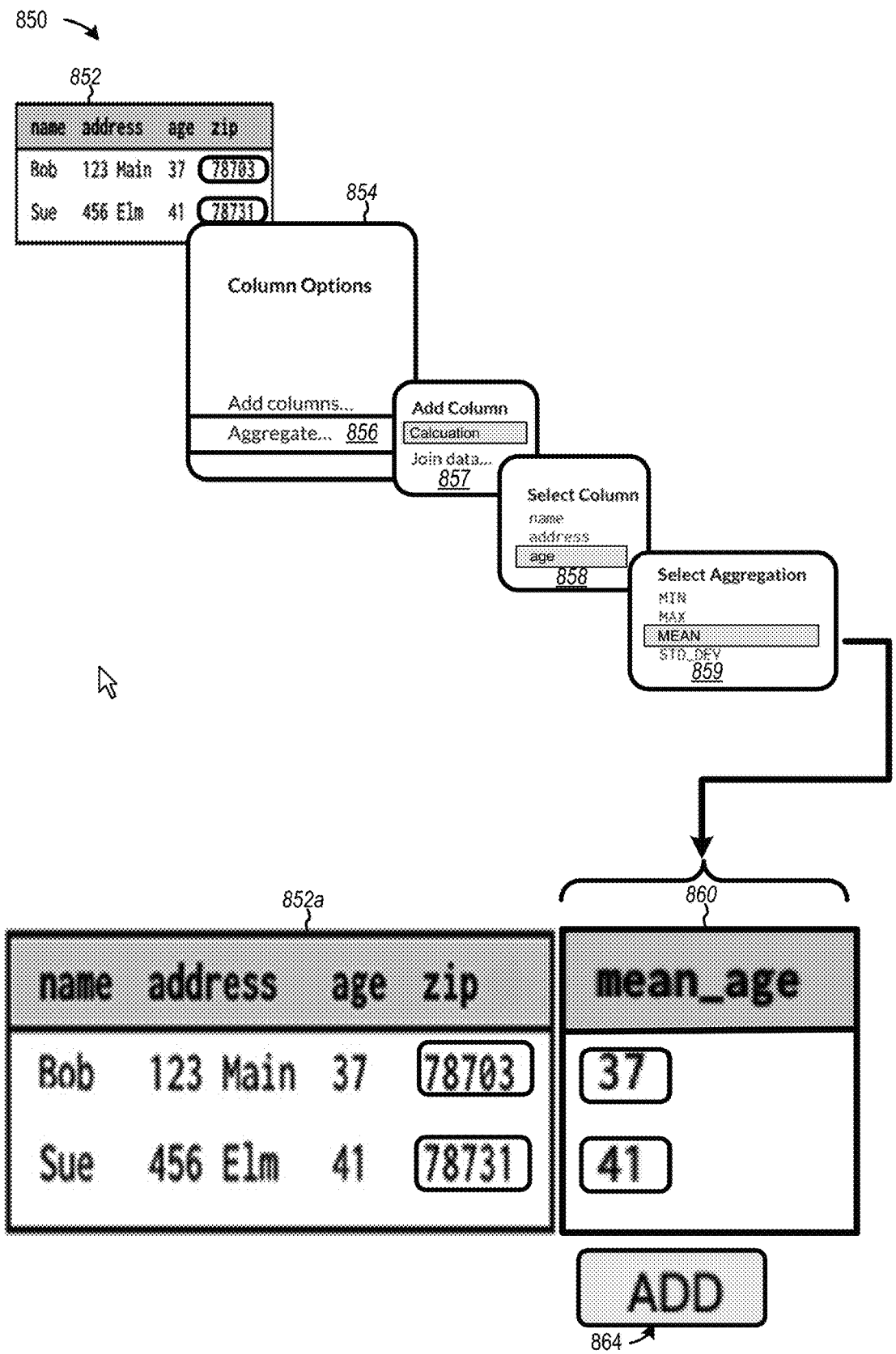

FIG. 8C is a diagram 850 depicting another example of interface processes of computerized tools to form an enhanced dataset, at least in some examples. To enhance dataset 832, a command may be activated to present interface portion 854, which presents options to aggregate data via computations or data modification applied to dataset 852. Selection 856, if selected, may cause presentations to enhance dataset 852a by adding data in a column representing "mean age" data 860 linked to zip codes 78703 and 78731, responsive to selections related to interface portions 857, 858, and 859. Thus, mean age data 860 may be derived via calculations applied to linked datasets that includes age-related data related to zip codes. Selection 864, if activated, may cause formation of an enhanced dataset based on 852 that includes mean age data 860.

In some examples, data representing 852 dataset may be analyzed to detect zip code data values with which to query against a pool of datasets based on a link-formative query. A link-formative query may be applied to a pool of datasets (e.g., other atomized datasets) based on zip code data values to detect other data points associated with "zip codes. A data value to form a computed data value of "mean age" data 860 associated with another data point may be calculated. The computed result includes a column of "mean age" data 860 that may include additional linkable data points in a pool of atomized datasets to further enhance formation of a merged dataset. The linkable data points may be linked to dataset 852*a* responsive to activation of input 864.

Figure 8D:
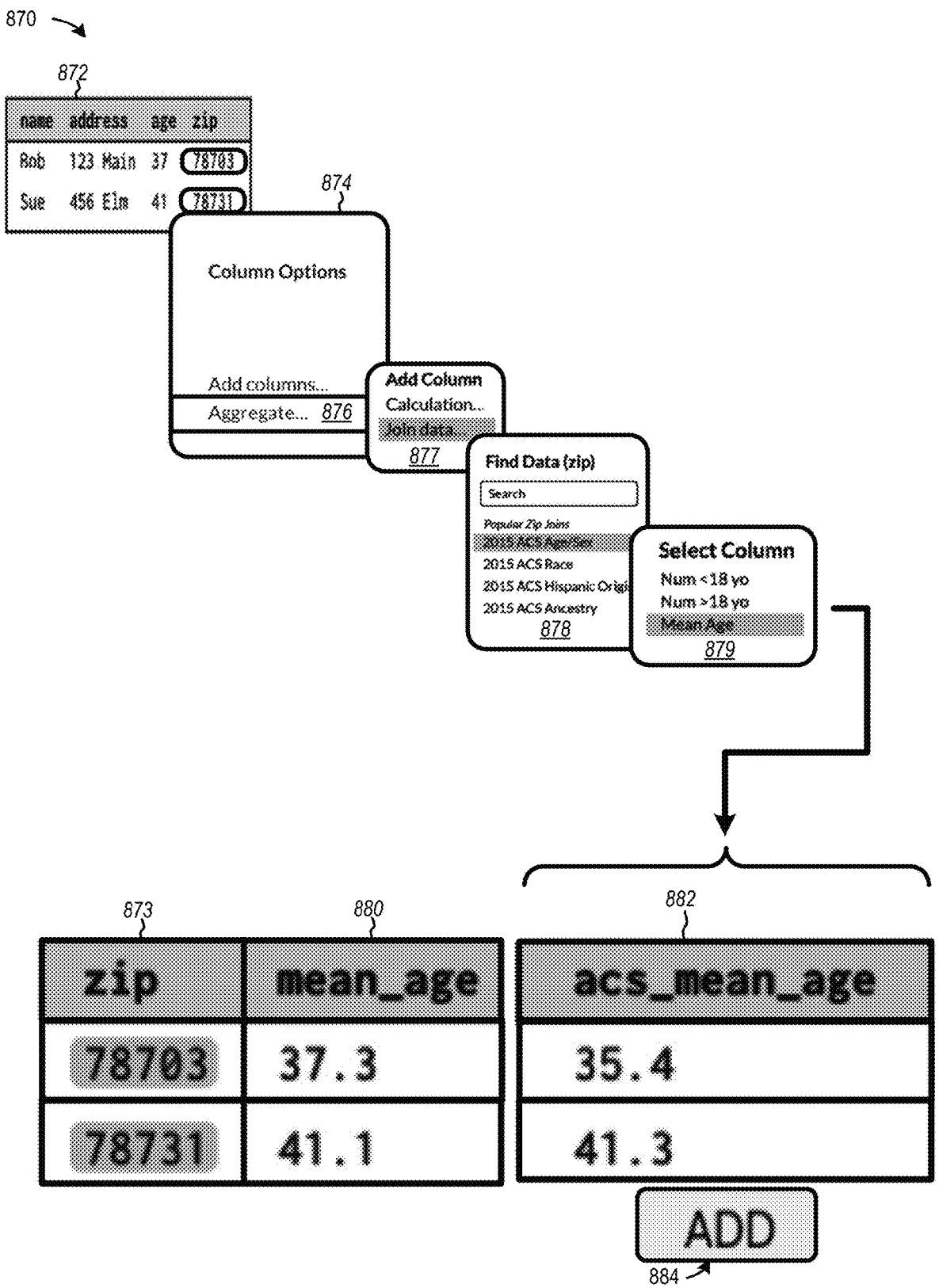

FIG. 8D is a diagram 870 depicting yet another example of interface processes of computerized tools to form an enhanced dataset, at least in some examples. To enhance dataset 872, a command may be activated to present interface portion 874, which presents options to aggregate data via computations or data modification applied to dataset 872. Selection 876, if selected, may cause presentations of user input selections to enhance dataset 872, which may include columns 873 and 880, by adding data in a column representing "ACS mean age" data 882 linked to zip codes 78703 and 78731, responsive to selections related to interface portions 877, 878, and 879. "ACS mean age" data may refer to American Community Survey ("ACS") data provided in U.S. Census data, as one example. Thus, ACS mean age data 882 may be derived via modifications applied to linked datasets that includes age-related data related to zip codes. Selection 884, if activated, may cause formation of an enhanced dataset based on 872 that includes ACS mean age data 884.

Figure 9:
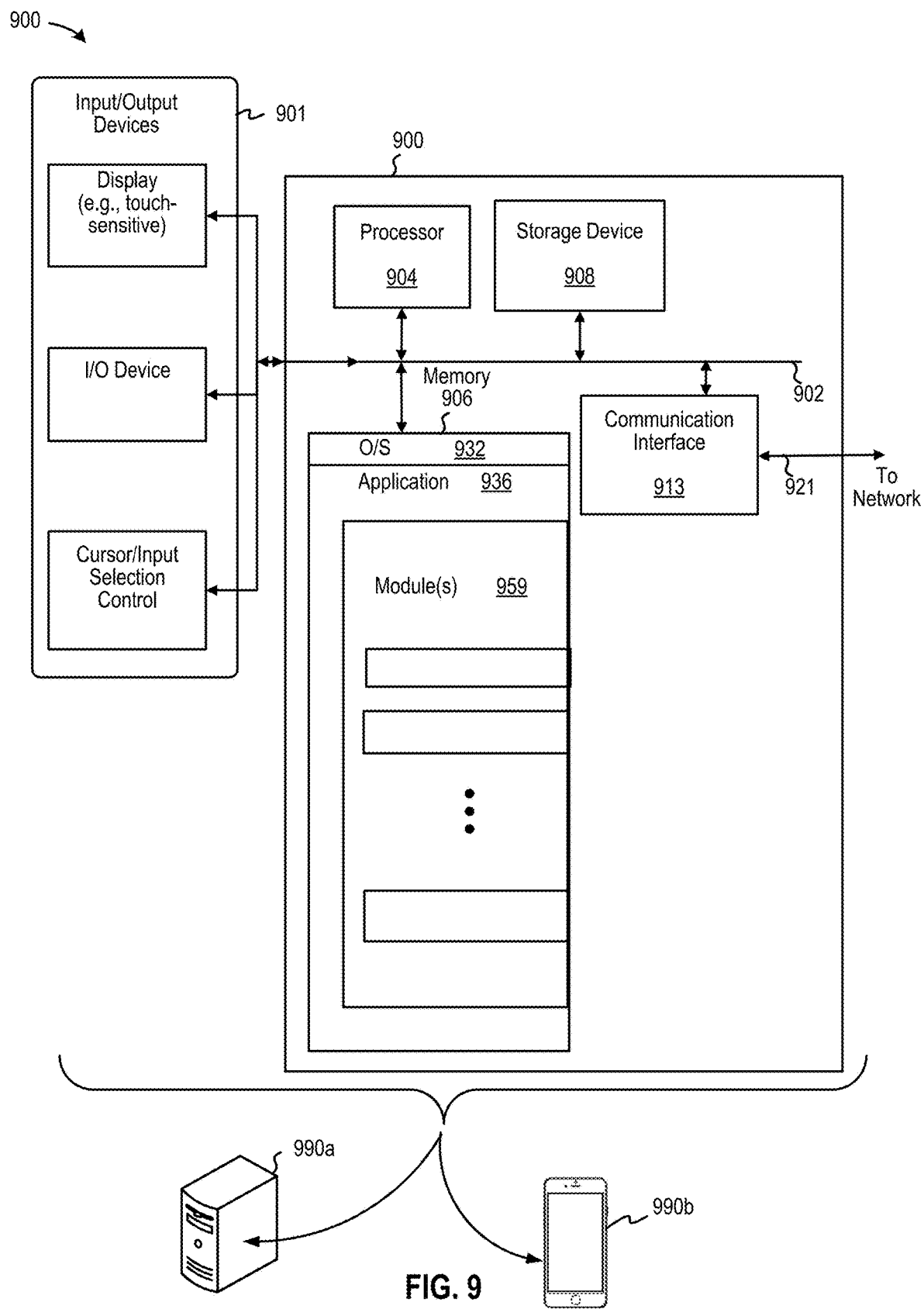
FIG. 9 illustrates examples of various computing platforms configured to provide various functionalities to components of a collaborative dataset consolidation system, according to various embodiments.

FIG. 9 illustrates examples of various computing platforms configured to provide various functionalities to any of one or more components of a collaborative dataset consolidation system, according to various embodiments. In some examples, computing platform 900 may be used to implement computer programs, applications, methods, processes, algorithms, or other software, as well as any hardware implementation thereof, to perform the above-described techniques.

In some cases, computing platform 900 or any portion (e.g., any structural or functional portion) can be disposed in any device, such as a computing device 990*a*, mobile computing device 990*b*, and/or a processing circuit in association with initiating the formation of collaborative datasets, as well as analyzing forming enhance datasets using transmuted associations, via user interfaces and user interface elements, according to various examples described herein.

Computing platform 900 includes a bus 902 or other communication mechanism for communicating information, which interconnects subsystems and devices, such as processor 904, system memory 906 (e.g., RAM, etc.), storage device 908 (e.g., ROM, etc.), an in-memory cache (which may be implemented in RAM 906 or other portions of computing platform 900), a communication interface 913 (e.g., an Ethernet or wireless controller, a Bluetooth controller, NFC logic, etc.) to facilitate communications via a port on communication link 921 to communicate, for example, with a computing device, including mobile computing and/or communication devices with processors, including database devices (e.g., storage devices configured to store atomized datasets, including, but not limited to triplestores, etc.). Processor 904 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 900 exchanges data representing inputs and outputs via input-and-output devices 901, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 901 may be implemented as, or otherwise substituted with, a user interface in a computing device associated with a user account identifier in accordance with the various examples described herein.

According to some examples, computing platform 900 performs specific operations by processor 904 executing one or more sequences of one or more instructions stored in system memory 906, and computing platform 900 can be implemented in a client-server arrangement, peer-to-peer arrangement, or as any mobile computing device, including smart phones and the like. Such instructions or data may be read into system memory 906 from another computer readable medium, such as storage device 908. In some examples, hard-wired circuitry may be used in place of or in combination with software instructions for implementation. Instructions may be embedded in software or firmware. The term "computer readable medium" refers to any tangible medium that participates in providing instructions to processor 904 for execution. Such a medium may take many forms, including but not limited to, non-volatile media and volatile media. Non-volatile media includes, for example, optical or magnetic disks and the like. Volatile media includes dynamic memory, such as system memory 906.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 902 for transmitting a computer data signal.

In some examples, execution of the sequences of instructions may be performed by computing platform 900. According to some examples, computing platform 900 can be coupled by communication link 921 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 900 may transmit and receive messages, data, and instructions, including program code (e.g., application code) through communication link 921 and communication interface 913. Received program code may be executed by processor 904 as it is received, and/or stored in memory 906 or other non-volatile storage for later execution.

In the example shown, system memory 906 can include various modules that include executable instructions to implement functionalities described herein. System memory 906 may include an operating system ("O/S") 932, as well as an application 936 and/or logic module(s) 959. In the example shown in FIG. 9, system memory 906 may include any number of modules 959, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 959 of FIG. 9, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 959 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 959 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, modules 959 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided. Further, none of the above-described implementations are abstract, but rather contribute significantly to improvements to functionalities and the art of computing devices.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:
1. A method comprising:
receiving data representing a dataset into dataset ingestion controller;
identifying a first data arrangement in which the data representing the dataset has a first format;
identifying a first referential indicator for a first set of the dataset in the first data arrangement;
determining an association with a value representative of the first referential indicator to an equivalent value representative of a second referential indicator associated with a second set of a different dataset;
formatting the dataset into a second data arrangement having a second format, the second data arrangement being a graph data arrangement generated using linked data and the dataset being converted from the first format into the second format, the second format comprising an atomized data format having one or more triples;
transmuting the association to form a transmuted association as a link between the value and the equivalent value; and
integrating the transmuted association into at least a portion of the first data arrangement.

2. The method of claim 1 wherein transmuting the association to form the transmuted association comprises:
transmuting an indexed-based association to form the transmuted association based on the second format.

3. The method of claim 2 wherein transmuting the indexed-based association comprises:
forming the linked data compatible with the second format; and
replacing the indexed-based association with the linked data.

4. The method of claim 2 wherein transmuting the indexed-based association comprises:
replacing an equality determination to join two or more datasets.

5. The method of claim 1 further comprising:
identifying one of the value and the equivalent value as a unique value; and
determining the association as one of one or more associations between the unique value to one or more equivalent values of the other of the first data arrangement and the second data arrangement.

6. The method of claim 1 further comprising:
wherein one of the first referential indicator and the second referential indicator is a value in one of the first data arrangement and the second data arrangement, and the value is linked to one or more equivalent values of the other of the first data arrangement and the second data arrangement.

7. The method of claim 1 further comprising:
wherein one of the first referential indicator and the second referential indicator is a primary key, and the other of the first referential indicator and the second referential indicator is a foreign key.

8. The method of claim 1 wherein formatting the dataset into a second data arrangement having a second format comprises:
formatting the dataset in a tabular data arrangement as the first data arrangement having a table format as the first format into a graph data arrangement as the second data arrangement having a graph format as the second format.

9. The method of claim 1 wherein formatting the dataset into a second data arrangement having a second format comprises:
forming referential data associated with a unit of data in a tabular data arrangement to the unit of data in a graph data arrangement.

10. The method of claim 9 further comprising:
receiving data representing a query; and
applying the query to either the tabular data arrangement or the graph data arrangement.

11. The method of claim 9 further comprising:
receiving data representing a query directed to the tabular data arrangement to join the dataset to the different dataset to extract data from both the dataset and the different dataset; and
using the transmuted association to retrieve results of the query.

12. The method of claim 11 wherein using the transmuted association retrieve the results of the query comprises:
applying the query via linked data, thereby foregoing computing equality operations to detect whether the first referential indicator matches the second referential indicator.

13. The method of claim 11 wherein receiving data representing the query comprises:
receiving a command configured to access a relational data structure.

14. The method of claim 1 further comprises:
generating data to present one or more user inputs in a user interface to initiate execution of instructions to associate the first referential indicator to the second referential indicator; and
receiving a response to at least one of the one or more user inputs to transmute the association to form the transmuted association.

15. An apparatus comprising:
a memory including executable instructions; and
a processor, responsive to executing the instructions, is configured to:
receive data representing a dataset into dataset ingestion controller;
arrange the data representing the dataset into a first data arrangement having a first format;
identify a first referential indicator for a first set of the dataset in the first data arrangement;
determine an association with a value representative of the first referential indicator to an equivalent value representative of a second referential indicator associated with a second set of a different dataset;
format the dataset into a second data arrangement having a second format, the second data arrangement being a graph data arrangement generated using linked data and the dataset being converted from the first format into the second format, the second format comprising an atomized data format having one or more triples;
transmute the association to form a transmuted association as a link between the value and the equivalent value; and
integrate the transmuted association into at least a portion of the first data arrangement.

16. The apparatus of claim 15 wherein a subset of the instructions to cause the processor to transmute the association to form the transmuted association further causes the processor to:
transmute an indexed-based association to form the transmuted association based on the second format.

17. The apparatus of claim 15 wherein a subset of the instructions to cause the processor to transmute the association to form the transmuted association further causes the processor to:
form the linked data compatible with the second format; and
replace the indexed-based association with the linked data.

18. The apparatus of claim 15 wherein of the first referential indicator and the second referential indicator is a primary key, and the other of the first referential indicator and the second referential indicator is a foreign key.

19. The apparatus of claim 15 wherein the processor is further configured to:

receive data representing a query directed to a tabular data arrangement to join the dataset to the different dataset to extract data from both the dataset and the different dataset; and use the transmuted association to retrieve results of the query.

\* \* \* \* \*